(12) United States Patent
Hu et al.

(10) Patent No.: US 10,750,530 B2
(45) Date of Patent: Aug. 18, 2020

(54) DATA TRANSMISSION METHOD AND APPARATUS

(71) Applicant: Huawei Technologies Co., Ltd., Shenzhen (CN)

(72) Inventors: Wenquan Hu, Lund (SE); Meng Hua, Shanghai (CN); Shurong Jiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 16/186,049

(22) Filed: Nov. 9, 2018

(65) Prior Publication Data
US 2019/0082458 A1 Mar. 14, 2019

Related U.S. Application Data

(63) Continuation of application No. PCT/CN2016/104797, filed on Nov. 4, 2016.

(30) Foreign Application Priority Data

May 12, 2016 (WO) ................ PCT/CN2016/081902

(51) Int. Cl.
*H04W 72/12* (2009.01)
*H04W 72/04* (2009.01)
(Continued)

(52) U.S. Cl.
CPC ..... *H04W 72/1289* (2013.01); *H04W 72/044* (2013.01); *H04W 48/12* (2013.01);
(Continued)

(58) Field of Classification Search
CPC ... H04W 72/00; H04W 72/12; H04W 72/126; H04W 72/1273; H04W 72/1278; H04W 72/1289; H04W 72/04; H04W 78/044; H04W 88/02; H04W 48/12; H04W 28/0278; H04W 74/00; H04W 74/04; H04L 47/70; H04L 47/78
See application file for complete search history.

(56) References Cited

U.S. PATENT DOCUMENTS 9,912,451 B2 * 3/2018 Berggren ............... H04L 5/0048
2010/0279628 A1 * 11/2010 Love ....................... H04L 5/003
455/70

(Continued)

FOREIGN PATENT DOCUMENTS

CN 101483475 A 7/2009
CN 101483916 A 7/2009
(Continued)

*Primary Examiner* — Warner Wong
(74) *Attorney, Agent, or Firm* — Slater Matsil, LLP

(57) ABSTRACT

Embodiments of the present disclosure provide a data transmission method and apparatus. The method includes sending, by a base station to UE, a downlink control channel used to schedule downlink data. The method further includes indicating, by the base station, a first time-frequency resource domain and a second time-frequency resource domain using the downlink control channel. A downlink data channel is sent on a time-frequency resource that is in the first time-frequency resource domain and that does not belong to the second time-frequency resource domain.

7 Claims, 14 Drawing Sheets

(51) Int. Cl.
  *H04W 48/12* (2009.01)
  *H04W 88/02* (2009.01)
  *H04W 88/08* (2009.01)
(52) U.S. Cl.
  CPC ........ *H04W 72/1273* (2013.01); *H04W 88/02* (2013.01); *H04W 88/08* (2013.01)

(56) References Cited

U.S. PATENT DOCUMENTS

| | | | |
|---|---|---|---|
| 2012/0287878 A1* | 11/2012 | Moon | H04L 5/001 |
| | | | 370/329 |
| 2013/0294368 A1 | 11/2013 | Bendlin et al. | |
| 2014/0086197 A1 | 3/2014 | Yang et al. | |
| 2014/0119335 A1* | 5/2014 | Wang | H04W 72/042 |
| | | | 370/330 |
| 2014/0192730 A1* | 7/2014 | Seo | H04L 5/0053 |
| | | | 370/329 |
| 2014/0204812 A1 | 7/2014 | Li et al. | |
| 2015/0071201 A1* | 3/2015 | Larsson | H04L 5/001 |
| | | | 370/329 |
| 2015/0264708 A1 | 9/2015 | Li et al. | |
| 2016/0044681 A1* | 2/2016 | Zhou | H04L 5/0051 |
| | | | 370/329 |
| 2016/0308648 A1 | 10/2016 | Li et al. | |
| 2016/0345344 A1* | 11/2016 | Larsson | H04W 72/1263 |
| 2018/0324834 A1* | 11/2018 | Sebire | H04L 5/14 |
| 2020/0015247 A1* | 1/2020 | Ji | H04W 72/1231 |

FOREIGN PATENT DOCUMENTS

| | | |
|---|---|---|
| CN | 101754376 A | 6/2010 |
| CN | 102263616 A | 11/2011 |
| CN | 103517432 A | 1/2014 |
| CN | 103581094 A | 2/2014 |
| CN | 103796327 A | 5/2014 |
| CN | 104661309 A | 5/2015 |
| EP | 3059876 A1 | 8/2016 |
| WO | 2008147123 A1 | 12/2008 |

* cited by examiner

DATA TRANSMISSION METHOD AND APPARATUS

CROSS-REFERENCE TO RELATED APPLICATIONS

This application is a continuation of International Application No. PCT/CN2016/104797, filed Nov. 4, 2016, which claims priority to International Application No. PCT/CN2016/081902, filed May 12, 2016. The disclosures of the aforementioned applications are hereby incorporated by reference in their entireties.

TECHNICAL FIELD

Embodiments of the present disclosure relate to communications technologies, and in particular, to a data transmission method and apparatus.

BACKGROUND

When data transmission is performed in an existing LTE system, one subframe is usually used as a basic transmission time interval (TTI), with a time length of 1 millisecond. Each subframe may be divided into two timeslots. Each timeslot includes seven orthogonal frequency division multiplexing (OFDM) symbols (corresponding to a normal cyclic prefix). In other words, one subframe includes 14 OFDM symbols. In an LTE downlink time-frequency resource, the first one to four OFDM symbols of a subframe are usually specified as a control region (Control Region), and a base station sends downlink control information (DCI) in the control region to perform uplink or downlink scheduling. In existing LTE, a physical downlink control channel (PDCCH) may be used to carry the DCI at a physical layer. In some implementations, the PDCCH includes one or more control channel elements (CCEs), and a quantity of CCEs included in a PDCCH is usually represented using an aggregation level. A CCE resource set used by a user terminal to perform PDCCH blind detection (Blind Detection) is referred to as a PDCCH search space (search space). Currently, when mapping a PDCCH in a subframe, the base station determines, based on a channel status of UE, an aggregation level used for the PDCCH, and performs mapping in a search space corresponding to the aggregation level. Each aggregation level is corresponding to one search space.

To reduce a transmission delay in a data communication process, the 3rd Generation Partnership Project (3GPP) considers reducing a conventional TTI whose length is 1 millisecond to a short TTI (sTTI) with one to seven symbols. Because a short TTI structure is used, a quantity of symbols of a TTI is reduced, but a quantity of OFDM symbols used to send the DCI remains unchanged, causing a larger proportion of resource overheads occupied by the PDCCH that carries the DCI. To reduce overheads of the PDCCH, in some implementations, a self-contained channel sending method in which the PDCCH is embedded, for sending, into a physical downlink shared channel (PDSCH) for sending data is used, and frequency domain interleaving is performed on the PDCCH control channel on a known time-frequency resource block, to reduce resource overheads. A PDCCH time-frequency resource domain is preset in a time-frequency resource domain of the PDSCH.

However, when the base station sends the downlink control channel to the UE using the self-contained channel sending method, a time-frequency resource in the preset PDCCH time-frequency resource domain is not necessarily occupied totally, causing time-frequency resource waste.

SUMMARY

Embodiments of the present disclosure provide a data transmission method and apparatus, to resolve a prior-art problem of time-frequency resource waste caused because a time-frequency resource used to send a downlink control channel is not occupied totally.

According to a first aspect, an embodiment of the present disclosure provides a data transmission method. The method includes sending, by a base station to UE, a downlink control channel used to schedule downlink data, and sending, to the UE, a downlink data channel scheduled using the downlink control channel. The method further includes indicating, by the base station, a first time-frequency resource domain of the downlink data channel and a second time-frequency resource domain using the downlink control channel. The downlink data channel is sent on a time-frequency resource that is in the first time-frequency resource domain and that does not belong to the second time-frequency resource domain.

Optionally, the indicating, by the base station, the second time-frequency resource domain using the downlink control channel includes indicating, by the base station, the second time-frequency resource domain using information about a time-frequency resource occupied by the downlink control channel.

Optionally, the indicating, by the base station, the second time-frequency resource domain using the downlink control channel includes indicating, by the base station, the second time-frequency resource domain using a first preset time-frequency resource location and the information about the time-frequency resource occupied by the downlink control channel.

Optionally, the information about the time-frequency resource occupied by the downlink control channel includes an end location of the time-frequency resource occupied by the downlink control channel, and the second time-frequency resource domain includes a time-frequency resource from the first preset time-frequency resource location to the end location of the time-frequency resource occupied by the downlink control channel.

Optionally, the information about the time-frequency resource occupied by the downlink control channel includes a start location of the time-frequency resource occupied by the downlink control channel, and the second time-frequency resource domain includes a time-frequency resource from the start location of the time-frequency resource occupied by the downlink control channel to a second preset time-frequency resource location.

Optionally, the downlink control channel carries first resource quantity indication information, and the indicating, by the base station, the second time-frequency resource domain using the downlink control channel includes indicating the second time-frequency resource domain based on the first resource quantity indication information in the downlink control channel and a location of a time-frequency resource occupied by the downlink control channel.

Optionally, the second time-frequency resource domain includes a time-frequency resource from a start location of the time-frequency resource occupied by the downlink control channel to a time-frequency resource location obtained after the start location of the time-frequency resource occupied by the downlink control channel is shifted by a resource quantity indicated by the first resource quantity indication information.

Optionally, the first resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of a time-frequency resource other than the time-frequency resource occupied by the downlink control channel in the second time-frequency resource domain; or a ratio of a size of a time-frequency resource other than the time-frequency resource occupied by the downlink control channel in the second time-frequency resource domain to the size of the preset time-frequency resource used to send a control channel.

Optionally, the downlink control channel carries second resource quantity indication information, and the indicating, by the base station, the second time-frequency resource domain using the downlink control channel includes indicating, by the base station, the second time-frequency resource domain using the second resource quantity indication information in the downlink control channel and a third preset time-frequency resource location.

Optionally, the base station indicates, using the second resource quantity indication information in the downlink control channel and the third preset time-frequency resource location, a time-frequency resource other than a time-frequency resource occupied by the downlink control channel in the second time-frequency resource domain.

Optionally, the time-frequency resource other than the time-frequency resource occupied by the downlink control channel in the second time-frequency resource domain includes a time-frequency resource from the third preset time-frequency resource location to a time-frequency resource location obtained after the third preset time-frequency resource location is shifted by a resource quantity indicated by the second resource quantity indication information.

Optionally, the second resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of the time-frequency resource other than the time-frequency resource occupied by the downlink control channel in the second time-frequency resource domain; or a ratio of a size of the time-frequency resource other than the time-frequency resource occupied by the downlink control channel in the second time-frequency resource domain to the size of the preset time-frequency resource used to send a control channel.

Optionally, a ratio of a size of a time-frequency resource occupied by a downlink control channel set that is carried in the second time-frequency resource domain and that includes at least one downlink control channel to a size of the second time-frequency resource domain is greater than a preset threshold.

Optionally, the sending, by the base station to the UE, a downlink data channel scheduled using the downlink control channel includes sending, by the base station to the UE through time-frequency resources in at least two first time-frequency resource domains, the downlink data channel scheduled using the downlink control channel. The downlink control channel carries third resource quantity indication information. The second time-frequency resource domain includes a time-frequency resource determined based on a fourth preset time-frequency resource location in each first time-frequency resource domain and the third resource quantity indication information, and a time-frequency resource occupied by the downlink control channel used to schedule downlink data.

Optionally, resource quantity information indicated by the third resource quantity indication information is a control channel element size indication, or resource quantity information indicated by the third resource quantity indication information is a control channel element location indication.

Optionally, the third resource quantity indication information indicates only one piece of resource quantity information, and the indicating, by the base station, a first time-frequency resource domain of the downlink data channel and a second time-frequency resource domain using the downlink control channel includes indicating, by the base station using the one piece of resource quantity information, the time-frequency resource determined based on the fourth preset time-frequency resource location in each first time-frequency resource domain and the third resource quantity indication information.

Optionally, information about the time-frequency resource occupied by the downlink control channel further includes time-frequency resource scheduling indication information, the time-frequency resource scheduling indication information is used to indicate a specific first time-frequency resource domain, and all time-frequency resources in the specific first time-frequency resource domain are used to send a downlink channel to the UE.

Optionally, the sending, by the base station to the UE, a downlink data channel scheduled using the downlink control channel includes sending, by the base station to the UE through time-frequency resources in at least two first time-frequency resource domains, the downlink data channel scheduled using the downlink control channel. Control channel elements in the at least two first time-frequency resource domains are connected in a head-to-tail manner to form a joint control channel resource domain. The downlink control channel carries fourth resource quantity indication information, and the base station indicates the second time-frequency resource domain using the downlink control channel. The second time-frequency resource domain includes a time-frequency resource determined based on a fifth preset time-frequency resource location in the joint control channel resource domain and the fourth resource quantity indication information, and a time-frequency resource occupied by the downlink control channel used to schedule downlink data.

According to a second aspect, an embodiment of the present disclosure further provides a channel resource indication method. The method includes receiving, by UE, a downlink control channel that is used to schedule downlink data and is sent by a base station, and a downlink data channel that is scheduled using the downlink control channel and is sent by the base station. The method further includes determining, by the UE, a first time-frequency resource domain of the downlink data channel and a second time-frequency resource domain based on the downlink control channel. The downlink data channel is sent on a time-frequency resource that is in the first time-frequency resource domain and that does not belong to the second time-frequency resource domain.

Optionally, the determining, by the UE, the second time-frequency resource domain based on the downlink control channel includes determining, by the UE, the second time-frequency resource domain based on information about a time-frequency resource occupied by the downlink control channel.

Optionally, the determining, by the UE, the second time-frequency resource domain based on the downlink control channel includes determining, by the UE, the second time-frequency resource domain based on a first preset time-frequency resource location and the information about the time-frequency resource occupied by the downlink control channel.

Optionally, the information about the time-frequency resource occupied by the downlink control channel includes an end location of the time-frequency resource occupied by the downlink control channel, and the second time-frequency resource domain includes a time-frequency resource from the first preset time-frequency resource location to the end location of the time-frequency resource occupied by the downlink control channel.

Optionally, the information about the time-frequency resource occupied by the downlink control channel includes a start location of the time-frequency resource occupied by the downlink control channel, and the second time-frequency resource domain includes a time-frequency resource from the start location of the time-frequency resource occupied by the downlink control channel to a second preset time-frequency resource location.

Optionally, the downlink control channel carries first resource quantity indication information, and the determining, by the UE, a second time-frequency resource domain based on the downlink control channel includes determining the second time-frequency resource domain based on the first resource quantity indication information in the downlink control channel and a start location of a time-frequency resource occupied by the downlink control channel.

Optionally, the second time-frequency resource domain includes a time-frequency resource from the start location of the time-frequency resource occupied by the downlink control channel to a time-frequency resource location obtained after the start location of the time-frequency resource occupied by the downlink control channel is shifted by a resource quantity indicated by the first resource quantity indication information.

Optionally, the first resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of a time-frequency resource other than the time-frequency resource occupied by the downlink control channel in the second time-frequency resource domain; or a ratio of a size of a time-frequency resource other than the time-frequency resource occupied by the downlink control channel in the second time-frequency resource domain to the size of the preset time-frequency resource used to send a control channel.

Optionally, the downlink control channel carries second resource quantity indication information, and the determining, by the UE, the second time-frequency resource domain based on the downlink control channel includes determining, by the UE, the second time-frequency resource domain based on the second resource quantity indication information in the downlink control channel and a third preset time-frequency resource location.

Optionally, the UE determines, based on the second resource quantity indication information in the downlink control channel and the third preset time-frequency resource location, a time-frequency resource other than a time-frequency resource occupied by the downlink control channel in the second time-frequency resource domain.

Optionally, the time-frequency resource other than the time-frequency resource occupied by the downlink control channel in the second time-frequency resource domain includes a time-frequency resource from the third preset time-frequency resource location to a time-frequency resource location obtained after the third preset time-frequency resource location is shifted by a resource quantity indicated by the second resource quantity indication information.

Optionally, the second resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of the time-frequency resource other than the time-frequency resource occupied by the downlink control channel in the second time-frequency resource domain; or a ratio of a size of the time-frequency resource other than the time-frequency resource occupied by the downlink control channel in the second time-frequency resource domain to the size of the preset time-frequency resource used to send a control channel.

Optionally, a ratio of a size of a time-frequency resource occupied by a downlink control channel set that is carried in the second time-frequency resource domain and that includes at least one downlink control channel to a size of the second time-frequency resource domain is greater than a preset threshold.

Optionally, the receiving, by UE, a downlink control channel that is used to schedule downlink data and is sent by a base station, and a downlink data channel that is scheduled using the downlink control channel and is sent by the base station includes receiving, by the UE, the downlink data channel that is sent by the base station to the UE through time-frequency resources in at least two first time-frequency resource domains and that is scheduled using the downlink control channel. The downlink control channel carries third resource quantity indication information. The second time-frequency resource domain includes a time-frequency resource determined based on a fourth preset time-frequency resource location in each first time-frequency resource domain and the third resource quantity indication information, and a time-frequency resource occupied by the downlink control channel used to schedule downlink data.

Optionally, resource quantity information indicated by the third resource quantity indication information is a control channel element size indication, or resource quantity information indicated by the third resource quantity indication information is a control channel element location indication.

Optionally, the third resource quantity indication information indicates only one piece of resource quantity information, and the determining, by the UE, a first time-frequency resource domain of the downlink data channel and a second time-frequency resource domain based on the downlink control channel includes determining, by the UE based on the one piece of resource quantity information, the time-frequency resource determined based on the fourth preset time-frequency resource location in each first time-frequency resource domain and the third resource quantity indication information.

Optionally, information about the time-frequency resource occupied by the downlink control channel further includes time-frequency resource scheduling indication information, the time-frequency resource scheduling indication information is used to indicate a specific first time-frequency resource domain, and all time-frequency resources in the specific first time-frequency resource domain are used to send a downlink channel to the UE.

Optionally, the receiving, by UE, a downlink control channel that is used to schedule downlink data and is sent by a base station, and a downlink data channel that is scheduled using the downlink control channel and is sent by the base station includes receiving, by the UE, the downlink data channel that is sent by the base station to the UE through time-frequency resources in at least two first time-frequency resource domains and that is scheduled using the downlink control channel. Control channel elements in the at least two first time-frequency resource domains are connected in a head-to-tail manner to form a joint control channel resource domain. The downlink control channel carries fourth resource quantity indication information, and the base station indicates the second time-frequency resource domain using the downlink control channel. The second time-frequency resource domain includes a time-frequency resource determined based on a fifth preset time-frequency resource location in the joint control channel resource domain and the fourth resource quantity indication information, and a time-frequency resource occupied by the downlink control channel used to schedule downlink data.

According to a third aspect, an embodiment of the present disclosure further provides a data transmission apparatus. The data transmission apparatus includes a sending module configured to send, to UE, a downlink control channel used to schedule downlink data, and to send, to the UE, a downlink data channel scheduled using the downlink control channel. The data transmission apparatus further includes a processing module configured to indicate a first time-frequency resource domain of the downlink data channel and a second time-frequency resource domain using the downlink control channel. The downlink data channel is sent on a time-frequency resource that is in the first time-frequency resource domain and that does not belong to the second time-frequency resource domain.

Optionally, the processing module is configured to indicate the second time-frequency resource domain using information about a time-frequency resource occupied by the downlink control channel.

Optionally, the processing module is configured to indicate the second time-frequency resource domain using a first preset time-frequency resource location and the information about the time-frequency resource occupied by the downlink control channel.

Optionally, the information about the time-frequency resource occupied by the downlink control channel includes an end location of the time-frequency resource occupied by the downlink control channel, and the second time-frequency resource domain includes a time-frequency resource from the first preset time-frequency resource location to the end location of the time-frequency resource occupied by the downlink control channel.

Optionally, the information about the time-frequency resource occupied by the downlink control channel includes a start location of the time-frequency resource occupied by the downlink control channel, and the second time-frequency resource domain includes a time-frequency resource from the start location of the time-frequency resource occupied by the downlink control channel to a second preset time-frequency resource location.

Optionally, the downlink control channel carries first resource quantity indication information, and the processing module is configured to indicate the second time-frequency resource domain based on the first resource quantity indication information in the downlink control channel and a location of a time-frequency resource occupied by the downlink control channel.

Optionally, the second time-frequency resource domain includes a time-frequency resource from a start location of the time-frequency resource occupied by the downlink control channel to a time-frequency resource location obtained after the start location of the time-frequency resource occupied by the downlink control channel is shifted by a resource quantity indicated by the first resource quantity indication information.

Optionally, the first resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of a time-frequency resource other than the time-frequency resource occupied by the downlink control channel in the second time-frequency resource domain; or a ratio of a size of a time-frequency resource other than the time-frequency resource occupied by the downlink control channel in the second time-frequency resource domain to the size of the preset time-frequency resource used to send a control channel.

Optionally, the downlink control channel carries second resource quantity indication information, and the processing module is configured to indicate the second time-frequency resource domain using the second resource quantity indication information in the downlink control channel and a third preset time-frequency resource location.

Optionally, the processing module is configured to indicate, using the second resource quantity indication information in the downlink control channel and the third preset time-frequency resource location, a time-frequency resource other than a time-frequency resource occupied by the downlink control channel in the second time-frequency resource domain.

Optionally, the time-frequency resource other than the time-frequency resource occupied by the downlink control channel in the second time-frequency resource domain includes a time-frequency resource from the third preset time-frequency resource location to a time-frequency resource location obtained after the third preset time-frequency resource location is shifted by a resource quantity indicated by the second resource quantity indication information.

Optionally, the second resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of the time-frequency resource other than the time-frequency resource occupied by the downlink control channel in the second time-frequency resource domain; or a ratio of a size of the time-frequency resource other than the time-frequency resource occupied by the downlink control channel in the second time-frequency resource domain to the size of the preset time-frequency resource used to send a control channel.

Optionally, a ratio of a size of a time-frequency resource occupied by a downlink control channel set that is carried in the second time-frequency resource domain and that includes at least one downlink control channel to a size of the second time-frequency resource domain is greater than a preset threshold.

Optionally, the sending module is configured to send, to the UE through time-frequency resources in at least two first time-frequency resource domains, the downlink data channel scheduled using the downlink control channel. The downlink control channel carries third resource quantity indication information. The second time-frequency resource domain includes a time-frequency resource determined based on a fourth preset time-frequency resource location in each first time-frequency resource domain and the third resource quantity indication information, and a time-frequency resource occupied by the downlink control channel used to schedule downlink data.

Optionally, resource quantity information indicated by the third resource quantity indication information is a control channel element size indication, or resource quantity information indicated by the third resource quantity indication information is a control channel element location indication.

Optionally, the third resource quantity indication information indicates only one piece of resource quantity information, and the processing module is configured to: indicate, based on the one piece of resource quantity information, the time-frequency resource determined based on the fourth preset time-frequency resource location in each first time-frequency resource domain and the third resource quantity indication information.

Optionally, information about the time-frequency resource occupied by the downlink control channel further includes time-frequency resource scheduling indication information, the time-frequency resource scheduling indication information is used to indicate a specific first time-frequency resource domain, and all time-frequency resources in the specific first time-frequency resource domain are used to send a downlink channel to the UE.

Optionally, the sending module is configured to send, to the UE through time-frequency resources in at least two first time-frequency resource domains, the downlink data channel scheduled using the downlink control channel. Control channel elements in the at least two first time-frequency resource domains are connected in a head-to-tail manner to form a joint control channel resource domain. The downlink control channel carries fourth resource quantity indication information, and the processing module indicates the second time-frequency resource domain using the downlink control channel. The second time-frequency resource domain includes a time-frequency resource determined based on a fifth preset time-frequency resource location in the joint control channel resource domain and the fourth resource quantity indication information, and a time-frequency resource occupied by the downlink control channel used to schedule downlink data.

According to a fourth aspect, an embodiment of the present disclosure further provides a channel resource indication apparatus. The channel resource indication apparatus includes a receiving module configured to receive a downlink control channel that is used to schedule downlink data and is sent by a base station, and a downlink data channel that is scheduled using the downlink control channel and is sent by the base station. The channel resource indication apparatus further includes a processing module configured to determine a first time-frequency resource domain of the downlink data channel and a second time-frequency resource domain based on the received downlink control channel. The downlink data channel is sent on a time-frequency resource that is in the first time-frequency resource domain and that does not belong to the second time-frequency resource domain.

Optionally, the processing module is configured to determine the second time-frequency resource domain based on information about a time-frequency resource occupied by the downlink control channel.

Optionally, the processing module is configured to determine the second time-frequency resource domain based on a first preset time-frequency resource location and the information about the time-frequency resource occupied by the downlink control channel.

Optionally, the information about the time-frequency resource occupied by the downlink control channel includes an end location of the time-frequency resource occupied by the downlink control channel, and the second time-frequency resource domain includes a time-frequency resource from the first preset time-frequency resource location to the end location of the time-frequency resource occupied by the downlink control channel.

Optionally, the information about the time-frequency resource occupied by the downlink control channel includes a start location of the time-frequency resource occupied by the downlink control channel, and the second time-frequency resource domain includes a time-frequency resource from the start location of the time-frequency resource occupied by the downlink control channel to a second preset time-frequency resource location.

Optionally, the downlink control channel carries first resource quantity indication information, and the processing module is configured to determine the second time-frequency resource domain based on the first resource quantity indication information in the downlink control channel and a start location of a time-frequency resource occupied by the downlink control channel.

Optionally, the second time-frequency resource domain includes a time-frequency resource from the start location of the time-frequency resource occupied by the downlink control channel to a time-frequency resource location obtained after the start location of the time-frequency resource occupied by the downlink control channel is shifted by a resource quantity indicated by the first resource quantity indication information.

Optionally, the first resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of a time-frequency resource other than the time-frequency resource occupied by the downlink control channel in the second time-frequency resource domain; or a ratio of a size of a time-frequency resource other than the time-frequency resource occupied by the downlink control channel in the second time-frequency resource domain to the size of the preset time-frequency resource used to send a control channel.

Optionally, the downlink control channel carries second resource quantity indication information, and the processing module is configured to determine the second time-frequency resource domain based on the second resource quantity indication information in the downlink control channel and a third preset time-frequency resource location.

Optionally, the processing module is configured to determine, based on the second resource quantity indication information in the downlink control channel and the third preset time-frequency resource location, a time-frequency resource other than a time-frequency resource occupied by the downlink control channel in the second time-frequency resource domain.

Optionally, the time-frequency resource other than the time-frequency resource occupied by the downlink control channel in the second time-frequency resource domain includes a time-frequency resource from the third preset time-frequency resource location to a time-frequency resource location obtained after the third preset time-frequency resource location is shifted by a resource quantity indicated by the second resource quantity indication information.

Optionally, the second resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of the time-frequency resource other than the time-frequency resource occupied by the downlink control channel in the second time-frequency resource domain; or a ratio of a size of the time-frequency resource other than the time-frequency resource occupied by the downlink control channel in the second time-frequency resource domain to the size of the preset time-frequency resource used to send a control channel.

Optionally, a ratio of a size of a time-frequency resource occupied by a downlink control channel set that is carried in the second time-frequency resource domain and that includes at least one downlink control channel to a size of the second time-frequency resource domain is greater than a preset threshold.

Optionally, the receiving module is configured to receive the downlink data channel that is sent by the base station through time-frequency resources in at least two first time-frequency resource domains and that is scheduled using the downlink control channel. The downlink control channel carries third resource quantity indication information. The second time-frequency resource domain includes a time-frequency resource determined based on a fourth preset time-frequency resource location in each first time-frequency resource domain and the third resource quantity indication information, and a time-frequency resource occupied by the downlink control channel used to schedule downlink data.

Optionally, resource quantity information indicated by the third resource quantity indication information is a control channel element size indication, or resource quantity information indicated by the third resource quantity indication information is a control channel element location indication.

Optionally, the third resource quantity indication information indicates only one piece of resource quantity information, and the processing module is configured to determine, based on the one piece of resource quantity information, the time-frequency resource determined based on the fourth preset time-frequency resource location in each first time-frequency resource domain and the third resource quantity indication information.

Optionally, information about the time-frequency resource occupied by the downlink control channel further includes time-frequency resource scheduling indication information, the time-frequency resource scheduling indication information is used to indicate a specific first time-frequency resource domain, and all time-frequency resources in the specific first time-frequency resource domain are used to send the downlink data channel.

Optionally, the receiving module is configured to receive the downlink data channel that is sent by the base station to the UE through time-frequency resources in at least two first time-frequency resource domains and that is scheduled using the downlink control channel. Control channel elements in the at least two first time-frequency resource domains are connected in a head-to-tail manner to form a joint control channel resource domain. The downlink control channel carries fourth resource quantity indication information, and the processing module determines the second time-frequency resource domain using the downlink control channel. The second time-frequency resource domain includes a time-frequency resource determined based on a fifth preset time-frequency resource location in the joint control channel resource domain and the fourth resource quantity indication information, and a time-frequency resource occupied by the downlink control channel used to schedule downlink data.

According to a fifth aspect, an embodiment of the present disclosure further provides a data transmission apparatus. The data transmission apparatus includes a transmitter configured to send, to UE, a downlink control channel used to schedule downlink data, and to send, to the UE, a downlink data channel scheduled using the downlink control channel. The data transmission apparatus further includes a processor configured to indicate a first time-frequency resource domain of the downlink data channel and a second time-frequency resource domain using the downlink control channel. The downlink data channel is sent on a time-frequency resource that is in the first time-frequency resource domain and that does not belong to the second time-frequency resource domain.

According to a sixth aspect, an embodiment of the present disclosure further provides a data transmission apparatus. The data transmission apparatus includes a receiver configured to receive a downlink control channel that is used to schedule downlink data and is sent by a base station, and a downlink data channel that is scheduled using the downlink control channel and is sent by the base station. The data transmission apparatus further includes a processor configured to determine a first time-frequency resource domain of the downlink data channel and a second time-frequency resource domain based on the received downlink control channel. The downlink data channel is sent on a time-frequency resource that is in the first time-frequency resource domain and that does not belong to the second time-frequency resource domain.

According to the data transmission method and apparatus provided in the embodiments of the present disclosure, the base station sends, to the UE, the downlink control channel used to schedule downlink data and the downlink data channel scheduled using the downlink control channel, and indicates the first time-frequency resource domain of the downlink data channel and the second time-frequency resource domain using the downlink control channel. The downlink data channel is sent on the time-frequency resource that is in the first time-frequency resource domain and that does not belong to the second time-frequency resource domain. Using the data transmission method provided in the embodiments of the present disclosure, when sending, to the UE, the downlink control channel used to schedule downlink data, the base station may indicate an unoccupied time-frequency resource in a preset control channel time-frequency resource domain in a current sTTI using the downlink control channel. Therefore, when scheduling the downlink data channel, the base station can reuse the unoccupied time-frequency resource in the preset time-frequency resource domain used to send a PDCCH, to improve time-frequency resource utilization.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

The embodiments of the present disclosure provide a data transmission method and apparatus, so as to indicate, in a process of sending a downlink control channel (PDCCH) to UE by a base station, an unoccupied time-frequency resource in a preset time-frequency resource domain used to send a PDCCH. Therefore, when scheduling a downlink data channel, the base station can reuse the unoccupied time-frequency resource in the preset time-frequency resource domain used to send a PDCCH, to improve time-frequency resource utilization.

Figure 1:
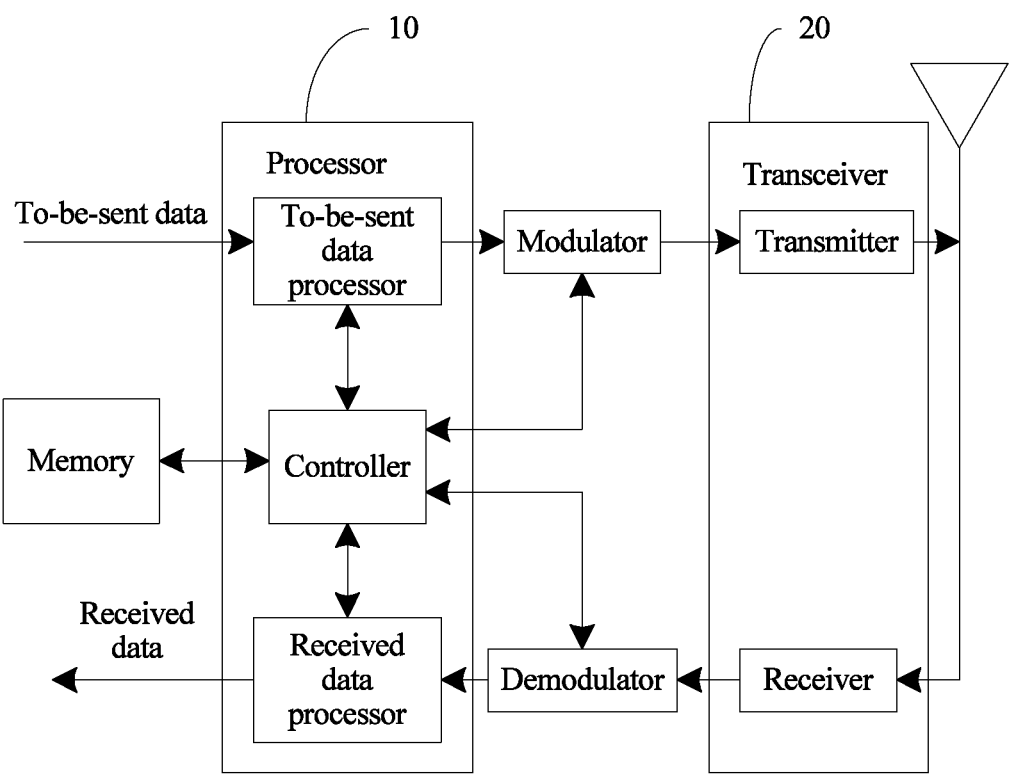
FIG. 1 is a schematic structural diagram of an architecture of a data transmission apparatus according to an embodiment of the present disclosure.

FIG. 1 is a schematic structural diagram of an architecture of a data transmission apparatus according to an embodiment of the present disclosure.

Referring to FIG. 1, the data transmission apparatus in the embodiment of the present disclosure includes a processor 10 and a transceiver 20. The data transmission apparatus may be disposed in a base station or user equipment (UE).

In the embodiment of the present disclosure, a base station side generates, in the processor 10, a downlink control channel used to schedule downlink data for the UE and a downlink data channel scheduled using the downlink control channel; and sends, to the UE using the transceiver 20, the downlink data channel and the downlink control channel used to schedule downlink data for the UE.

Figure 2:
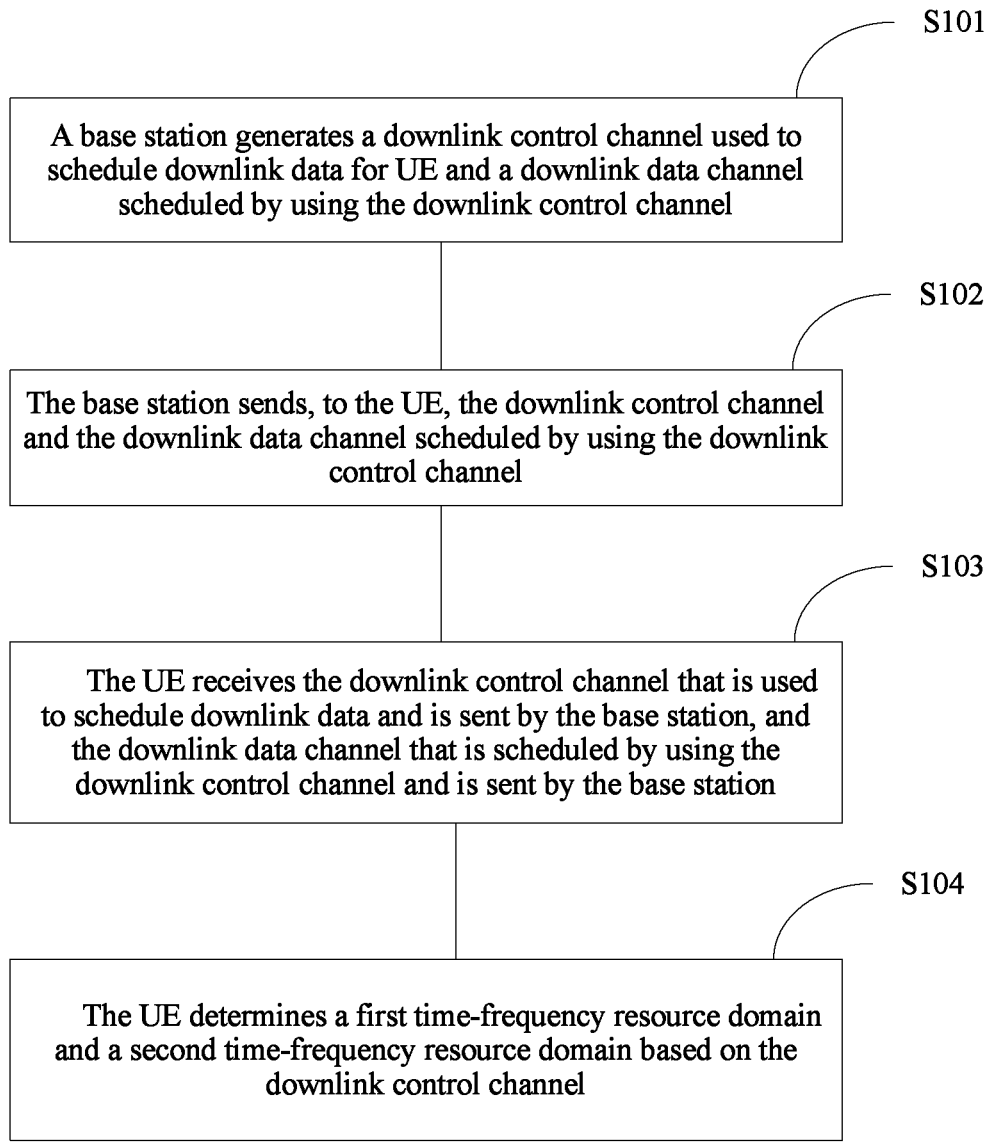
FIG. 2 is a schematic flowchart of a data transmission method according to an embodiment of the present disclosure.

FIG. 2 is a schematic flowchart of a data transmission method according to an embodiment of the present disclosure.

Referring to FIG. 2, the data transmission method provided in the embodiment of the present disclosure includes the following steps.

S101: A base station generates a downlink PDCCH used to schedule downlink data for UE and a downlink data channel scheduled using the downlink PDCCH.

S102: The base station sends the downlink PDCCH to the UE, and sends, to the UE, the downlink data channel scheduled using the downlink PDCCH.

The base station indicates a first time-frequency resource domain of the downlink data channel and a second time-frequency resource domain using the downlink PDCCH. The downlink data channel is sent on a time-frequency resource that is in the first time-frequency resource domain and that does not belong to the second time-frequency resource domain.

A control channel time-frequency resource domain used to send a downlink control channel is preset in some time-frequency resources in the first time-frequency resource domain of the downlink data channel, and the second time-frequency resource domain includes all occupied time-frequency resources in the control channel time-frequency resource domain. Specifically, a time-frequency resource in the second time-frequency resource domain may be used to send the downlink PDCCH used to schedule downlink data, or send an uplink PDCCH used to schedule uplink data, or send another downlink control channel used for ACK feedback. Alternatively, the second time-frequency resource domain may include a time-frequency resource occupied by a reference signal (RS) or a broadcast channel (BCH).

On a basis of the foregoing embodiment, the base station may indicate the second time-frequency resource domain in the following implementations.

In an implementation, that the base station indicates the second time-frequency resource domain using the downlink control channel includes the following:

The base station indicates the second time-frequency resource domain based on information about a time-frequency resource occupied by the downlink control channel.

Optionally, the base station indicates the second time-frequency resource domain based on a first preset time-frequency resource location and the information about the time-frequency resource occupied by the downlink control channel.

In the foregoing implementation, the first preset time-frequency resource location may be a start location of a time-frequency resource occupied by the uplink PDCCH or another PDCCH.

Specifically, when mapping a downlink control channel PDCCH in a subframe, the base station determines, based on a channel status of the UE, an aggregation level used for the PDCCH, and performs mapping in a search space corresponding to the aggregation level. Each aggregation level is corresponding to one search space. A size of the search space is related to a quantity of candidate PDCCHs that can be supported at the aggregation level. A start point of the search space may be calculated according to a predefined function relationship based on at least one of a UE ID (such as a radio network temporary identifier) of the UE, a subframe index that carries PDCCH mapping, or a timeslot index that carries PDCCH mapping. At each aggregation level, the size and the start point of the search space are system-specified. Therefore, when the PDCCH is mapped to a time-frequency resource in the control channel resource domain, the first preset time-frequency resource location may be determined. In other words, the base station may implicitly indicate the second time-frequency resource domain using the downlink PDCCH used to schedule downlink data, to reduce indication overheads of the downlink PDCCH.

On a basis of the foregoing embodiment, the information about the time-frequency resource occupied by the downlink control channel includes an end location of the time-frequency resource occupied by the downlink control channel, and the second time-frequency resource domain includes a time-frequency resource from the first preset time-frequency resource location to the end location of the time-frequency resource occupied by the downlink control channel.

Figure 3:
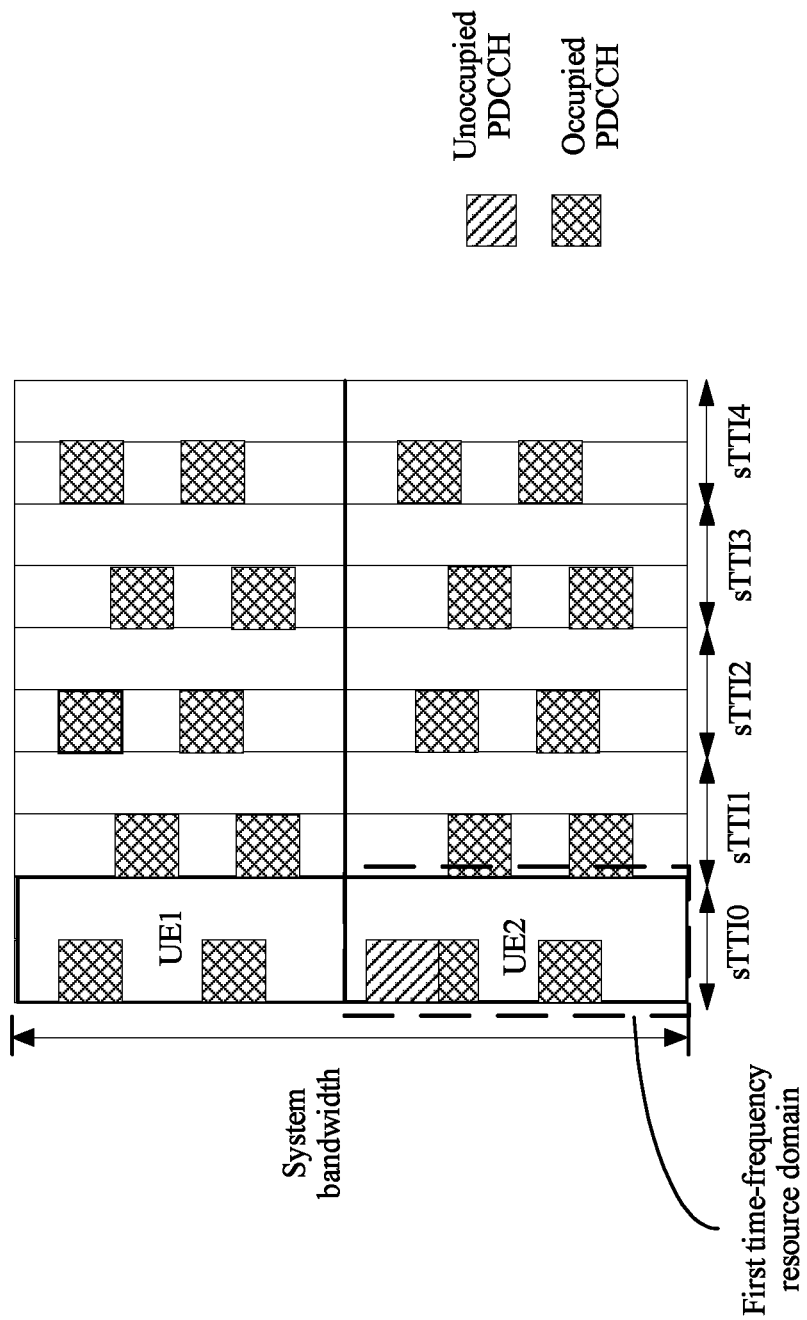
FIG. 3 is a schematic diagram of time-frequency resource distribution of a downlink control channel and a downlink data channel in a data transmission method according to an embodiment of the present disclosure.
Figure 4:
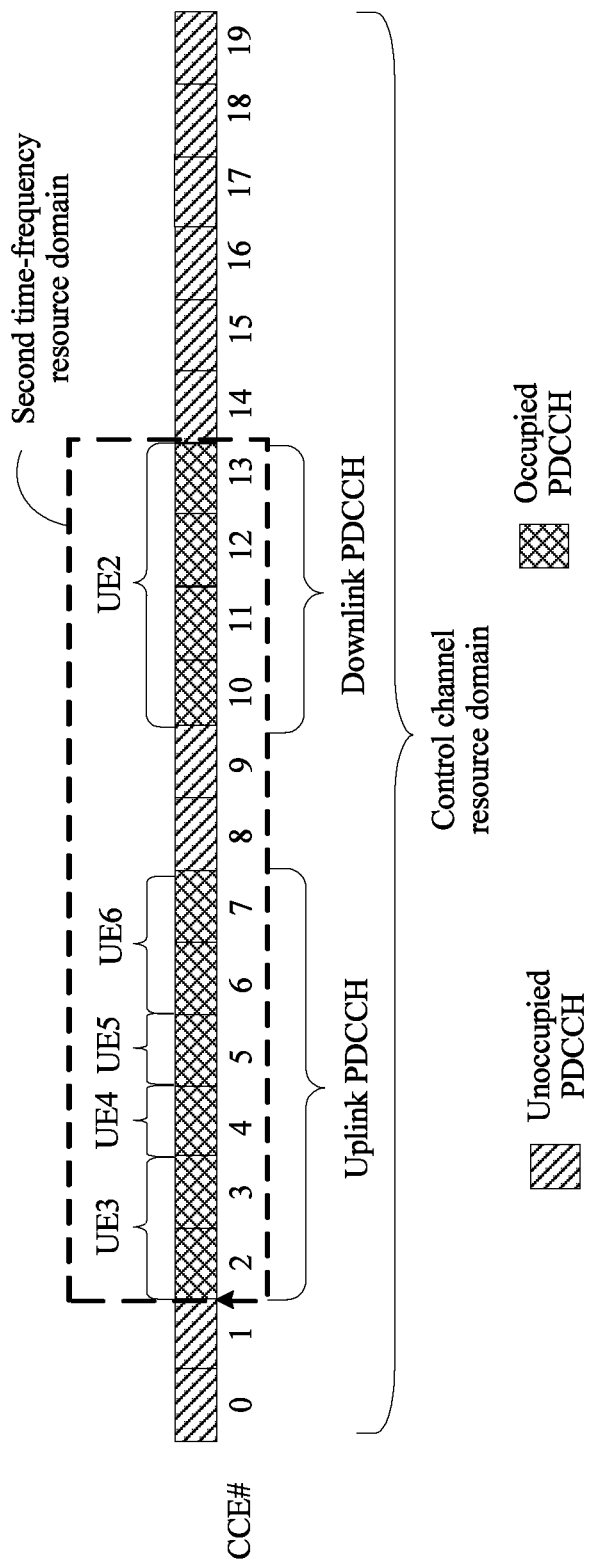
FIG. 4 is a schematic distribution diagram of a time-frequency resource occupied by the downlink control channel in FIG. 3.

The following describes in detail the foregoing implementation of step S102 with reference to FIG. 3 and FIG. 4.

FIG. 3 is a schematic diagram of time-frequency resource distribution of a downlink control channel and a downlink data channel in a data transmission method according to an embodiment of the present disclosure. FIG. 4 is a schematic distribution diagram of a time-frequency resource occupied by the downlink control channel in FIG. 3.

Specifically, referring to FIG. 3, a data channel with a self-contained structure is used as an example. The base station schedules a downlink data channel for UE2 on a time-frequency resource block (namely, the first time-frequency resource domain) in a short transmission time interval (sTTI) with a self-contained structure. The control channel time-frequency resource domain is preset in the first time-frequency resource domain (as shown in FIG. 4). The control channel time-frequency resource domain may be used to send the downlink PDCCH used to schedule downlink data for the UE2 and an uplink PDCCH used to schedule uplink data for another UE. In this implementation, the first time-frequency resource domain includes all time-frequency resources in the second time-frequency resource domain.

Time-frequency resources occupied by the downlink PDCCH used to schedule downlink data and the uplink PDCCH used to schedule uplink data are in a unit of control channel element (CCE). The uplink PDCCH used to schedule uplink data is mapped starting from a known CCE location (namely, the first preset time-frequency resource location) in the time-frequency resource domain, and a quantity of CCEs occupied by the uplink PDCCH are allocated based on an aggregation level of the UE for which uplink scheduling is performed. The downlink PDCCH used to schedule downlink data is mapped on a time-frequency resource that is after a time-frequency resource occupied by the uplink PDCCH used to schedule uplink data. In this manner, all time-frequency resources occupied by the PDCCH in the preset control channel time-frequency resource domain are locally distributed, to form the second time-frequency resource domain. Specifically, that time-frequency resources occupied by the PDCCH in the preset control channel time-frequency resource domain are locally distributed means that a ratio of a size of all the time-frequency resources occupied by the PDCCH in the preset control channel time-frequency resource domain to a size of the second time-frequency resource domain is greater than a preset threshold. In this case, a time-frequency resource, other than a resource in the second time-frequency resource domain, in the first time-frequency resource domain may be used to send the downlink data channel.

As shown in FIG. 3, it is assumed that a length of one sTTI is two symbols, and the downlink control channel PDCCH is sent in the first symbol. Entire system bandwidth is divided into a plurality of time-frequency resource blocks. One time-frequency resource block (the first time-frequency resource domain) can be used to send a downlink data channel to a maximum of one UE. The control channel time-frequency resource domain is preset in one time-frequency resource block in each sTTI, to send the PDCCH.

Referring to FIG. 4, in an sTTI0, control channel elements logically changed from a CCE0 to a CCE(N−1) are formed in the preset control channel time-frequency resource domain. N is an integer greater than or equal to 0. In the embodiment shown in FIG. 4, N is 20. Resource mapping is performed, starting from a known time-frequency resource location (the first preset time-frequency resource location) CCE2, on the uplink PDCCH used to schedule uplink data. An aggregation level corresponding to UE3 for which uplink scheduling is performed in FIG. 4 is 2, and therefore two CCEs are occupied. The similar can be said for UE4, UE5, and UE6. The UE2 is UE for which downlink scheduling is performed, and an aggregation level corresponding to the UE2 is 4. Starting from the start CCE2, an optional start location of a downlink control channel whose aggregation level is 4 is the CCE2, a CCE6, a CCE10, a CCE14, and so on. Because the CCE2 to the CCE6 are occupied by the uplink PDCCH, a resource occupied by the PDCCH channel used to schedule downlink data for the UE2 may start from the CCE10 and the CCE14. After detecting the downlink PDCCH used to schedule downlink data for the UE2, the UE2 may learn that a time-frequency resource corresponding to a CCE other than the CCE2 to a CCE13 may be used to send the downlink data channel.

S103: The UE receives the downlink control channel that is used to schedule the downlink data and is sent by the base station, and the downlink data channel that is scheduled using the downlink control channel and is sent by the base station.

S104: The UE determines a first time-frequency resource domain of the downlink data channel and a second time-frequency resource domain based on the downlink control channel.

In an implementation, in a receiving process, when detecting the downlink data channel scheduled for the UE, the UE may learn of, in combination with the first preset time-frequency resource location and the end location of the downlink PDCCH used to schedule downlink data, a time-frequency resource included in the second time-frequency resource domain. The time-frequency resource that is in the first time-frequency resource domain and that does not belong to the second time-frequency resource domain may be used to send the downlink data channel. Further, the UE may further detect whether there is a PDCCH channel used to schedule uplink data for the UE.

If UE does not detect the downlink PDCCH used to schedule downlink data for the UE, the UE continues to detect whether there is a PDCCH channel used to schedule uplink data for the UE; otherwise, it indicates that the UE is not scheduled by the base station in a current sTTI.

Figure 5:
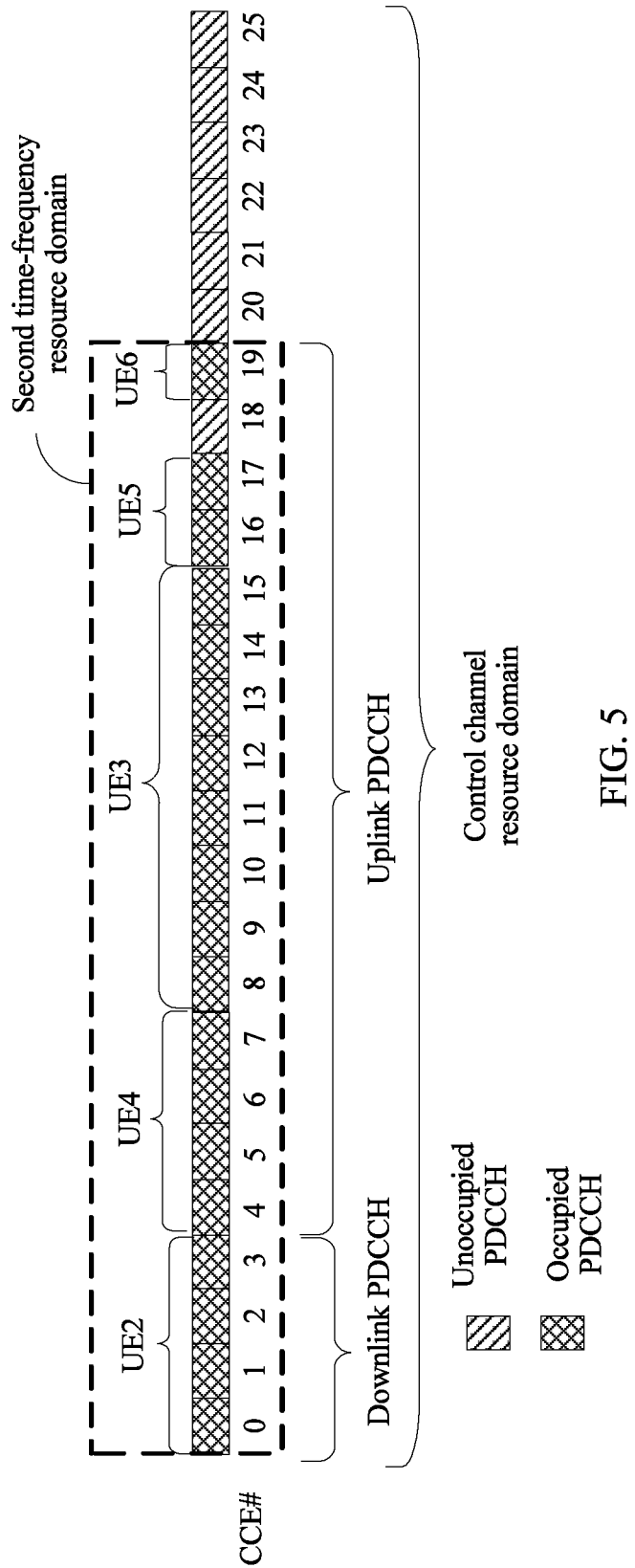
FIG. 5 is another schematic distribution diagram of a time-frequency resource occupied by the downlink control channel in FIG. 3.

FIG. 5 is another schematic distribution diagram of a time-frequency resource occupied by the downlink control channel in FIG. 3.

Referring to FIG. 3 and FIG. 5, optionally, in another implementation, the information about the time-frequency resource occupied by the downlink control channel includes a start location of the time-frequency resource occupied by the downlink control channel, and the second time-frequency resource domain includes a time-frequency resource from the start location of the time-frequency resource occupied by the downlink control channel to a second preset time-frequency resource location.

Referring to FIG. 5, in the control channel time-frequency resource domain, the downlink PDCCH used to schedule downlink data is mapped starting from a known CCE location in the time-frequency resource domain. A CCE is allocated based on an aggregation level corresponding to each UE for which uplink scheduling is performed. The uplink PDCCH used to schedule uplink data is mapped on a time-frequency resource that is after a time-frequency resource occupied by the downlink PDCCH used to schedule downlink data. In this manner, all occupied PDCCHs in the preset control channel time-frequency resource domain are locally distributed, to form the second time-frequency resource domain. In the embodiment, the second preset time-frequency resource location is an end location of a time-frequency resource occupied by the uplink PDCCH. The first time-frequency resource domain includes all time-frequency resources in the second time-frequency resource domain.

When mapping a downlink control channel PDCCH in a subframe, the base station determines, based on a channel status of the UE, an aggregation level used for the PDCCH, and performs mapping in a search space corresponding to the aggregation level. Each aggregation level is corresponding to one search space. A size of the search space is related to a quantity of candidate PDCCHs that can be supported at the aggregation level. A start point of the search space may be calculated according to a predefined function relationship based on at least one of a UE ID (such as a radio network temporary identifier) of the UE, a subframe index that carries PDCCH mapping, or a timeslot index that carries PDCCH mapping. At each aggregation level, the size and the start point of the search space are system-specified.

Therefore, in the foregoing embodiment, when the base station sends, to the UE, the downlink PDCCH used to schedule downlink data, a start location and an end location of the downlink PDCCH and the second preset time-frequency resource location may be determined. In other words, the base station may implicitly indicate the second time-frequency resource domain using the downlink PDCCH used to schedule downlink data, to reduce indication overheads of the downlink PDCCH.

In another implementation, the downlink control channel carries first resource quantity indication information, and that the base station indicates the second time-frequency resource domain using the downlink control channel includes the following:

The base station indicates the second time-frequency resource domain based on the first resource quantity indication information in the downlink control channel and a start location of a time-frequency resource occupied by the downlink control channel.

Specifically, referring to FIG. 5, similar to the foregoing implementation, in the control channel time-frequency resource domain, the uplink PDCCH used to schedule uplink data is mapped on a time-frequency resource that is after a time-frequency resource occupied by the downlink PDCCH used to schedule downlink data. In this manner, all occupied PDCCHs in the preset control channel time-frequency resource domain are locally distributed, to form the second time-frequency resource domain.

In addition, DCI carried in the downlink PDCCH carries the first resource quantity indication information. The base station indicates the second time-frequency resource domain based on the first resource quantity indication information in the downlink control channel and the start location of the time-frequency resource occupied by the downlink control channel.

Specifically, the second time-frequency resource domain includes a time-frequency resource from the start location of the time-frequency resource occupied by the downlink control channel to a time-frequency resource location obtained after the start location of the time-frequency resource occupied by the downlink control channel is shifted by a resource quantity indicated by the first resource quantity indication information.

In another implementation, the downlink control channel carries second resource quantity indication information, and that the base station indicates the second time-frequency resource domain using the downlink control channel includes the following:

The base station indicates the second time-frequency resource domain based on a third preset time-frequency resource location and the second resource quantity indication information in the downlink control channel used to schedule downlink data. Specifically, the base station indicates, using the second resource quantity indication information in the downlink control channel and the third preset time-frequency resource location, a time-frequency resource other than a time-frequency resource occupied by the downlink control channel in the second time-frequency resource domain.

The time-frequency resource other than the time-frequency resource occupied by the downlink control channel used to schedule downlink data in the second time-frequency resource domain includes a time-frequency resource from the third preset time-frequency resource location to a time-frequency resource location obtained after the third preset time-frequency resource location is shifted by a resource quantity indicated by the second resource quantity indication information.

The third preset time-frequency resource location is a start location of a time-frequency resource occupied by a downlink control channel other than the downlink control channel used to schedule downlink data.

Specifically, a determining manner of the third preset time-frequency resource location is the same as a determining manner of the first preset time-frequency resource location and a determining manner of the second preset time-frequency resource location.

Figure 6A:
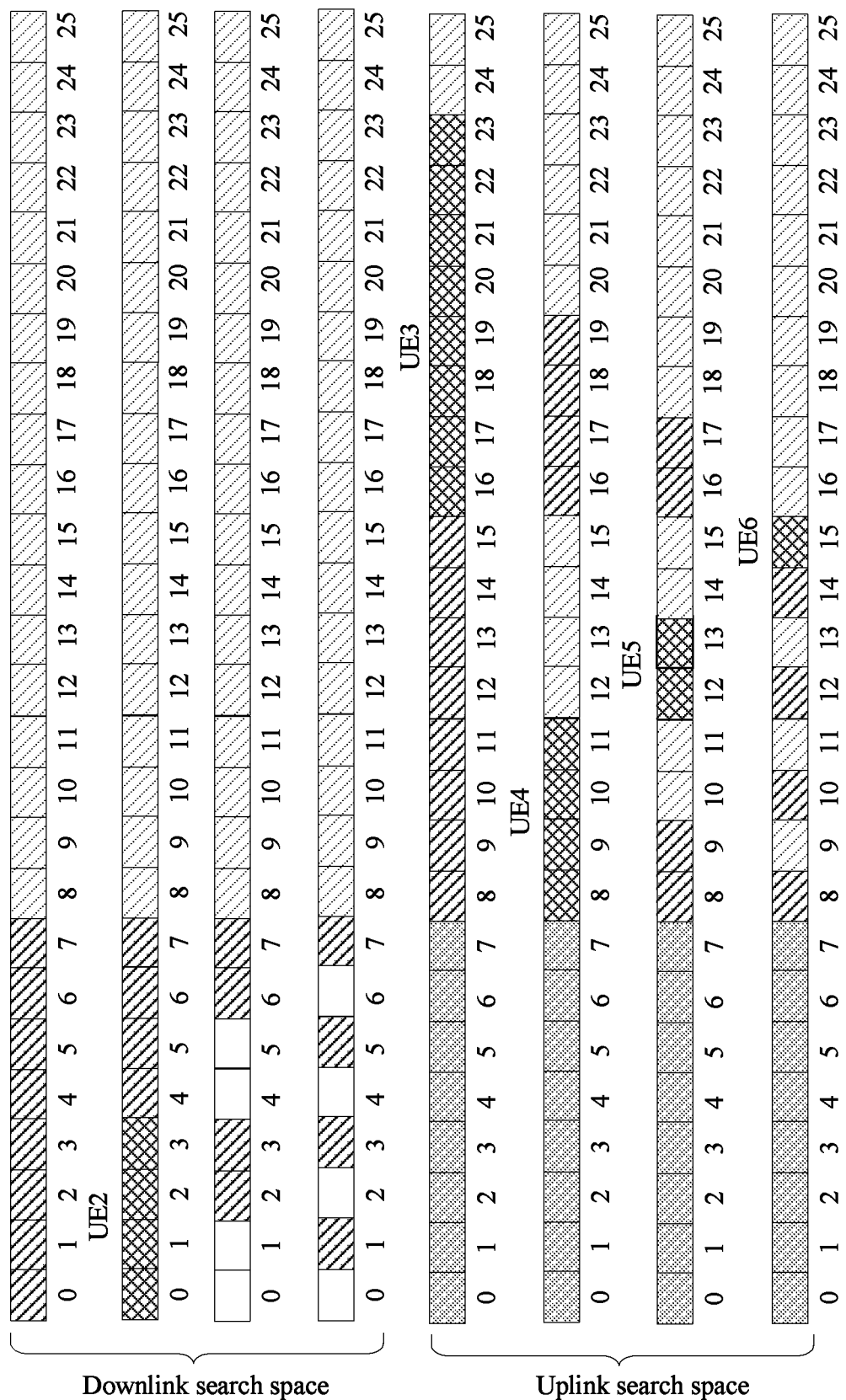
FIG. 6(a) is a schematic diagram of an uplink search space and a downlink search space in a data transmission method according to an embodiment of the present disclosure.
Figure 6B:
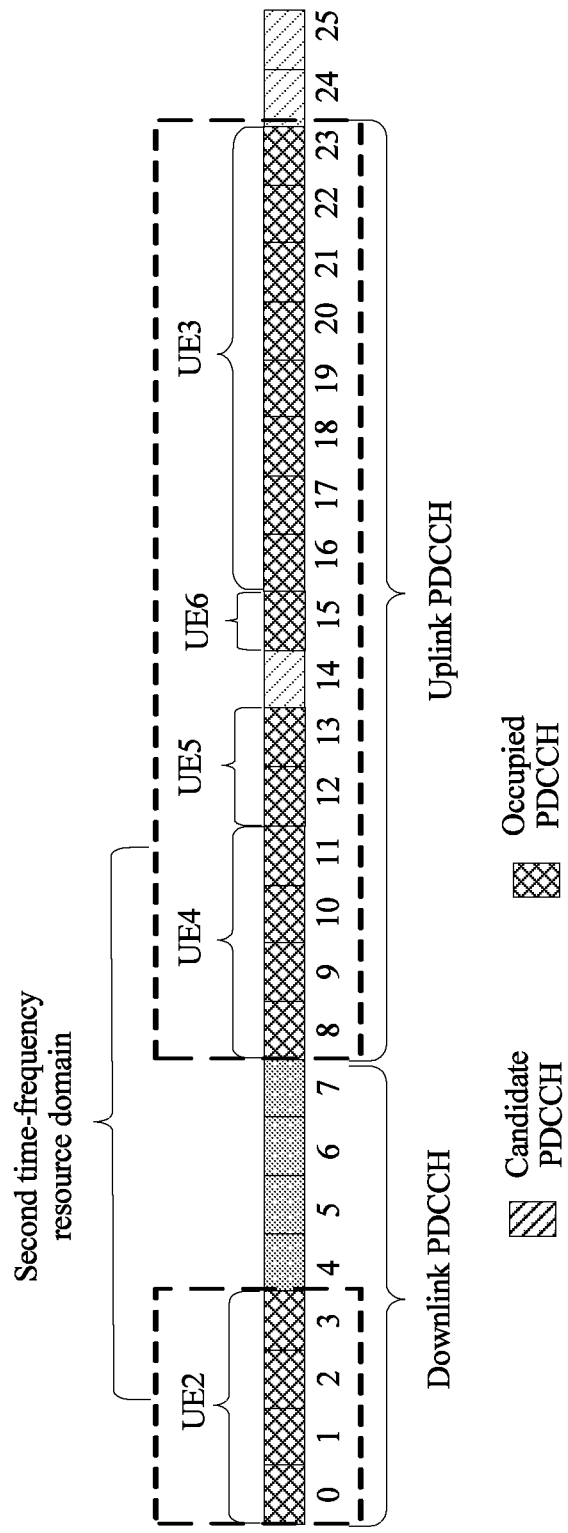
FIG. 6(b) is a distribution diagram of a time-frequency resource occupied by a downlink control channel determined based on the uplink search space and the downlink search space in FIG. 6(a)
Figure 7A:
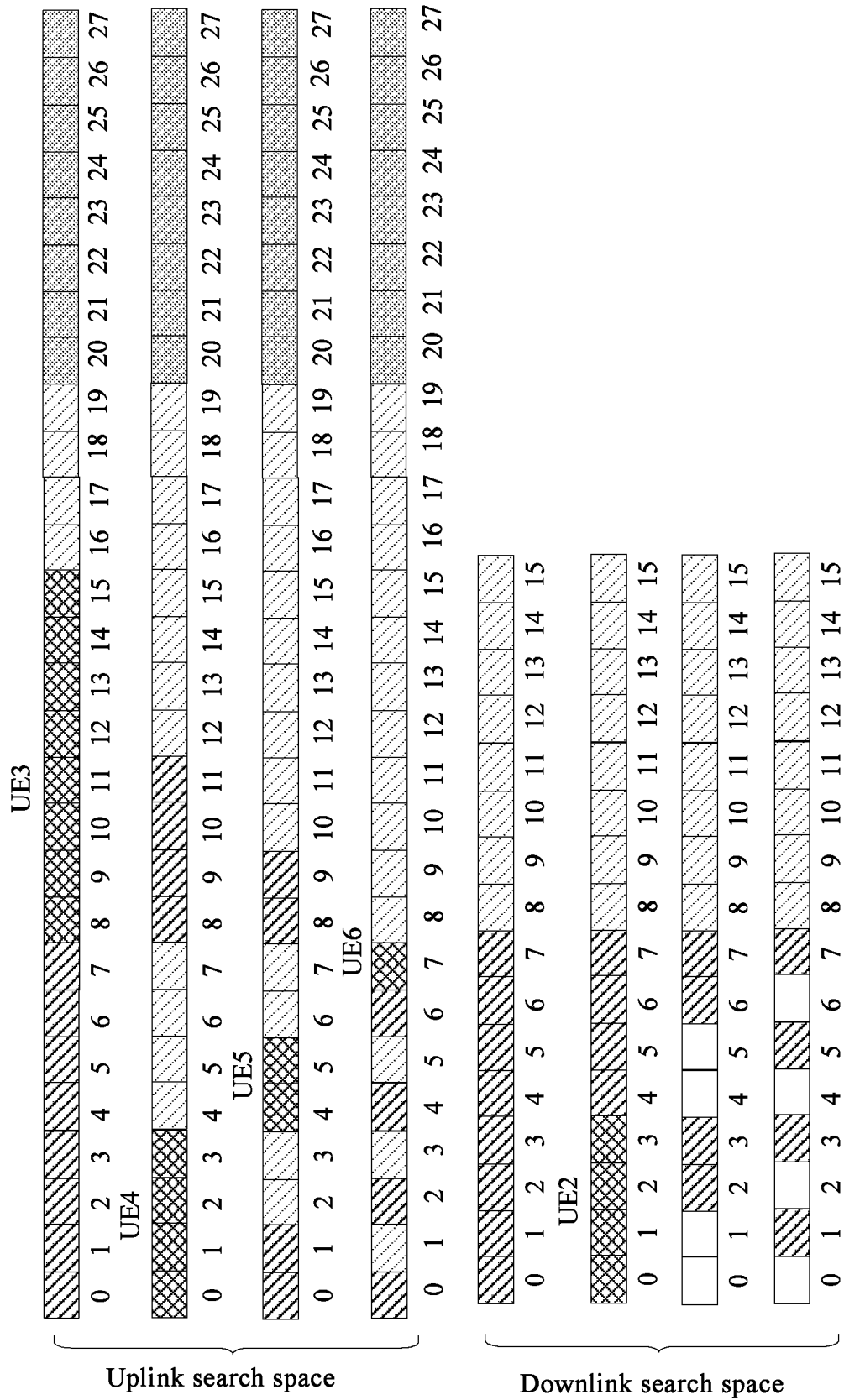
FIG. 7(a) is a schematic diagram of another uplink search space and another downlink search space in a data transmission method according to an embodiment of the present disclosure.
Figure 7B:
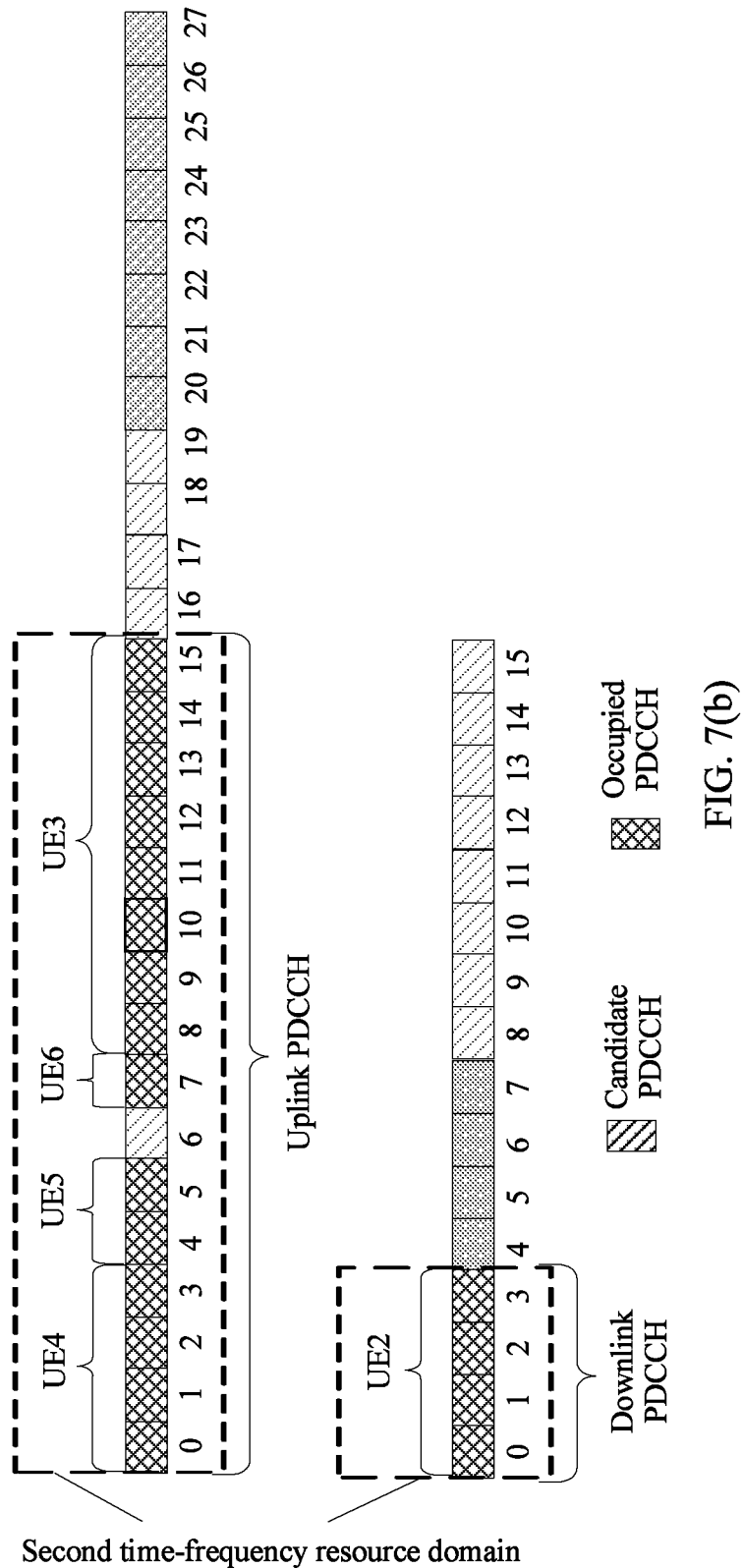
FIG. 7(b) is a distribution diagram of a time-frequency resource occupied by a downlink control channel determined based on the uplink search space and the downlink search space in FIG. 7(a)

FIG. 6(a) is a schematic diagram of an uplink search space and a downlink search space in a data transmission method according to an embodiment of the present disclosure. FIG. 6(b) is a distribution diagram of a time-frequency resource occupied by a downlink control channel determined based on the uplink search space and the downlink search space in FIG. 6(a). FIG. 7(a) is a schematic diagram of another uplink search space and another downlink search space in a data transmission method according to an embodiment of the present disclosure. FIG. 7(b) is a distribution diagram of a time-frequency resource occupied by a downlink control channel determined based on the uplink search space and the downlink search space in FIG. 7(a).

The foregoing implementation is described in the following in detail with reference to FIG. 3 and FIG. 6(a) to FIG. 7(b). Referring to FIG. 3, FIG. 6(a), and FIG. 6(b), a downlink control search space and an uplink search space are separately defined in the control channel time-frequency resource domain that is preset in a data channel resource with a self-contained structure. The downlink control search space is corresponding to the downlink PDCCH used to schedule downlink data, and the uplink search space is corresponding to an uplink PDCCH used for uplink scheduling or acknowledgement (ACK) feedback. The downlink PDCCH channel used to schedule the downlink data channel is mapped on a time-frequency resource defined in the downlink control search space. A control channel element is allocated in the uplink search space based on an aggregation level corresponding to each UE for which uplink scheduling is performed. By defining time-frequency resources in the control channel time-frequency resource domain, the base station may implicitly indicate, based on a time-frequency resource difference, whether downlink control information (DCI) carried in the downlink PDCCH and the uplink PDCCH is used for uplink scheduling or downlink scheduling, without additionally occupying a resource for indication, so that control channel indication overheads are reduced.

All PDCCH channels used for uplink scheduling or ACK feedback are locally distributed in the preset control channel resource domain, and the second resource quantity indication information may be carried in the DCI carried in the downlink PDCCH used to schedule downlink data. The time-frequency resource other than the time-frequency resource occupied by the downlink PDCCH used to schedule downlink data in the second time-frequency resource domain may be indicated based on the second resource quantity indication information and the third preset time-frequency resource location, and includes a time-frequency resource occupied by the uplink PDCCH used for uplink data scheduling or ACK feedback, or the time-frequency resource occupied by the RS and the BCH channel. An unused control channel time-frequency resource, in the control channel time-frequency resource domain, other than the time-frequency resource occupied by the downlink PDCCH used to schedule downlink data and the indicated time-frequency resource may be used to send the downlink data channel in a current TTI, so that time-frequency resource reusing efficiency is improved while control overheads are low.

After detecting the downlink PDCCH used to schedule downlink data for the UE, the UE learns of, based on the second resource quantity indication information in the DCI carried in the downlink PDCCH and the second preset time-frequency resource location, a size of the time-frequency resource occupied by the uplink PDCCH, and therefore learns of occupied time-frequency resources in the control channel time-frequency resource domain. The unused time-frequency resource in the preset control channel time-frequency resource domain is used to send the downlink data channel. Further, the UE may further detect whether there is a PDCCH channel used to schedule uplink data for the UE. If the downlink PDCCH used to schedule downlink data for the UE is not detected by the UE, the UE continues to detect whether there is the uplink PDCCH used to schedule uplink data for the UE. If no PDCCH is detected, it indicates that the UE is not scheduled by the base station in a current sTTI.

Specifically, as shown in FIG. 6(a) and FIG. 6(b), it is assumed that a length of one sTTI is two symbols, and the control channel is sent in the first symbol. Entire system bandwidth is divided into a plurality of time-frequency resource blocks. One time-frequency resource block can be used to send a downlink data channel sPDSCH to a maximum of one UE. The control channel time-frequency resource domain is preset on one time-frequency resource block (namely, the first time-frequency resource domain) in each sTTI. In an sTTI0, CCEs logically changed from a CCE0 to a CCE25 are formed in the preset control channel time-frequency resource domain. Resource mapping is performed, in the control channel time-frequency resource domain based on candidate subsets defined at different aggregation levels, on the downlink PDCCH used to schedule downlink data. For example, an aggregation level corresponding to UE2 for which downlink scheduling is performed is 4, and mapping is performed on a total of four CCEs in the downlink control search space: the CCE0 to a CCE3. Resource mapping is performed, in the control channel time-frequency resource domain based on candidate subsets defined at different aggregation levels, on the uplink PDCCH used to schedule uplink data. For example, an aggregation level corresponding to UE3 for which uplink scheduling is performed is 8, and eight CCEs are occupied in the uplink search space. The similar can be said for UE4, UE5, and UE6. In this implementation, both the uplink search space and the downlink search space are defined in the first time-frequency resource domain, and the second time-frequency resource domain formed by occupied time-frequency resources in the control channel time-frequency resource domain is a part of the first time-frequency resource domain. In other words, the first time-frequency resource domain includes all time-frequency resources in the second time-frequency resource domain. The downlink data channel is sent on the time-frequency resource that is in the first time-frequency resource domain and that does not belong to the second time-frequency resource domain.

After detecting the downlink PDCCH used to schedule downlink data for the UE2, the UE2 learns, from the second resource quantity indication information in the DCI carried in the downlink PDCCH, that the size of the resource occupied by the uplink PDCCH used to schedule uplink data is 16 CCEs. The second resource quantity indication information may be a relative value, for example, the size of the time-frequency resource occupied by the uplink PDCCH is represented using a quantized value corresponding to 3 bits (bit) (where 000, 001, . . . , and 111 are respectively corresponding to 1/8, 2/8, 3/8, . . . , and 8/8). FIG. 5 is used as an example. A preset quantity of time-frequency resources that can be used to map the uplink PDCCH used to schedule uplink data is 16 CCEs, and a length of actually occupied CCEs is also 16. In this case, a quantized value corresponding to 111 may be used to indicate that the size of the time-frequency resource occupied by the uplink PDCCH used to schedule uplink data is 16 CCEs. It can be learned, based on the second preset time-frequency resource location, namely, a start location of the time-frequency resource occupied by the uplink PDCCH used to schedule uplink data, that a CCE other than the CCE0 to the CCE3 and a CCE8 to a CCE23 may be used to perform resource mapping on the downlink data channel scheduled for the UE2.

Referring to FIG. 3, FIG. 7(*a*), and FIG. 7(*b*), it is assumed that a length of one sTTI is two symbols, and the downlink control channel PDCCH is sent in the first symbol. Entire system bandwidth is divided into a plurality of time-frequency resource blocks. One time-frequency resource block can be used to send a downlink data channel to a maximum of one UE. As shown in FIG. 7(*a*), a first control channel time-frequency resource domain is preset on one time-frequency resource block (namely, the first time-frequency resource domain) in each sTTI, to send the downlink PDCCH used to schedule downlink data. A downlink control search space corresponding to the downlink PDCCH is defined in the first control channel time-frequency resource domain. For example, in an sTTI0, CCEs logically changed from a CCE0 to CCE15 are formed in the control channel time-frequency resource domain in the time-frequency resource block used to schedule downlink data for UE2. A second control channel time-frequency resource domain is preset on the entire system bandwidth, to send the uplink PDCCH used to schedule uplink data. An uplink search space corresponding to the uplink PDCCH is defined on the system bandwidth. For example, on the entire system bandwidth in the sTTI0, CCEs logically changed from a CCE0 to a CCE27 are formed on a preset time-frequency resource block. In this implementation, because the second control channel time-frequency resource domain is defined on the entire system bandwidth in the sTTI0, the second control channel time-frequency resource domain includes a time-frequency resource other than a resource in the first time-frequency resource domain. The second time-frequency resource domain includes some occupied time-frequency resources in the first control channel resource domain and some occupied time-frequency resources in the second control channel time-frequency resource. Therefore, when the occupied time-frequency resource in the second control channel is the time-frequency resource other than the resource in the first time-frequency resource domain, a time-frequency resource in the second time-frequency resource domain does not totally belong to the first time-frequency resource domain, but overlaps a time-frequency resource in the first time-frequency resource domain. The downlink data channel is sent on the time-frequency resource that is in the first time-frequency resource domain and that does not belong to the second time-frequency resource domain.

Resource mapping is performed, based on candidate subsets defined at different aggregation levels, on the downlink PDCCH used to schedule downlink data. For example, an aggregation level corresponding to the UE2 for which downlink scheduling is performed is 4, and mapping is performed on a total of four CCEs in the downlink search space: the CCE0 to a CCE3. Resource mapping is performed, based on candidate subsets defined at different aggregation levels, on the uplink PDCCH used to schedule uplink data. For example, an aggregation level corresponding to UE3 for which uplink scheduling is performed is 8, and therefore eight CCEs are occupied in the uplink search space. The similar can be said for UE4, UE5, and UE6. After detecting the downlink PDCCH used to schedule downlink data for the UE2, the UE2 learns, from DCI carried in the downlink PDCCH, that a size of a time-frequency resource occupied by the uplink PDCCH is 16 CCEs, to learn that a time-frequency resource other than the CCE0 to the CCE3 in the first control channel time-frequency resource domain and the CCE0 to the CCE15 in the second control channel time-frequency resource domain may be used to perform resource mapping on the downlink data channel.

On a basis of the foregoing embodiment, the first resource quantity indication information and the second resource quantity indication information include any one of the following: a size of the time-frequency resource included in the second time-frequency resource domain; a ratio of a size of the time-frequency resource included in the second time-frequency resource domain to a size of a preset time-frequency resource used to send a control channel; a size of the time-frequency resource other than the time-frequency resource occupied by the downlink control channel in the second time-frequency resource domain; or a ratio of a size of the time-frequency resource other than the time-frequency resource occupied by the downlink control channel in the second time-frequency resource domain to the size of the preset time-frequency resource used to send a control channel.

Specifically, a time-frequency resource occupied by a downlink control channel set that is carried in the second time-frequency resource domain and that includes at least one downlink control channel is locally distributed. In other words, a ratio of a size of the time-frequency resource occupied by the downlink control channel set that is carried in the second time-frequency resource domain and that includes at least one downlink control channel to the size of the second time-frequency resource domain is greater than a preset threshold. The time-frequency resource occupied by the downlink control channel set is locally distributed, so that when the second time-frequency resource domain is indicated using the first resource quantity indication information or the second resource quantity indication information that is carried in the DCI, only one piece of resource size information and one second preset time-frequency resource location are required to indicate the second time-frequency resource domain. Compared with a prior-art manner in which the time-frequency resource occupied by the downlink control channel set is distributed in a dispersed manner, indication overheads of the first resource quantity indication information and the second resource quantity indication information are reduced.

Figure 8:
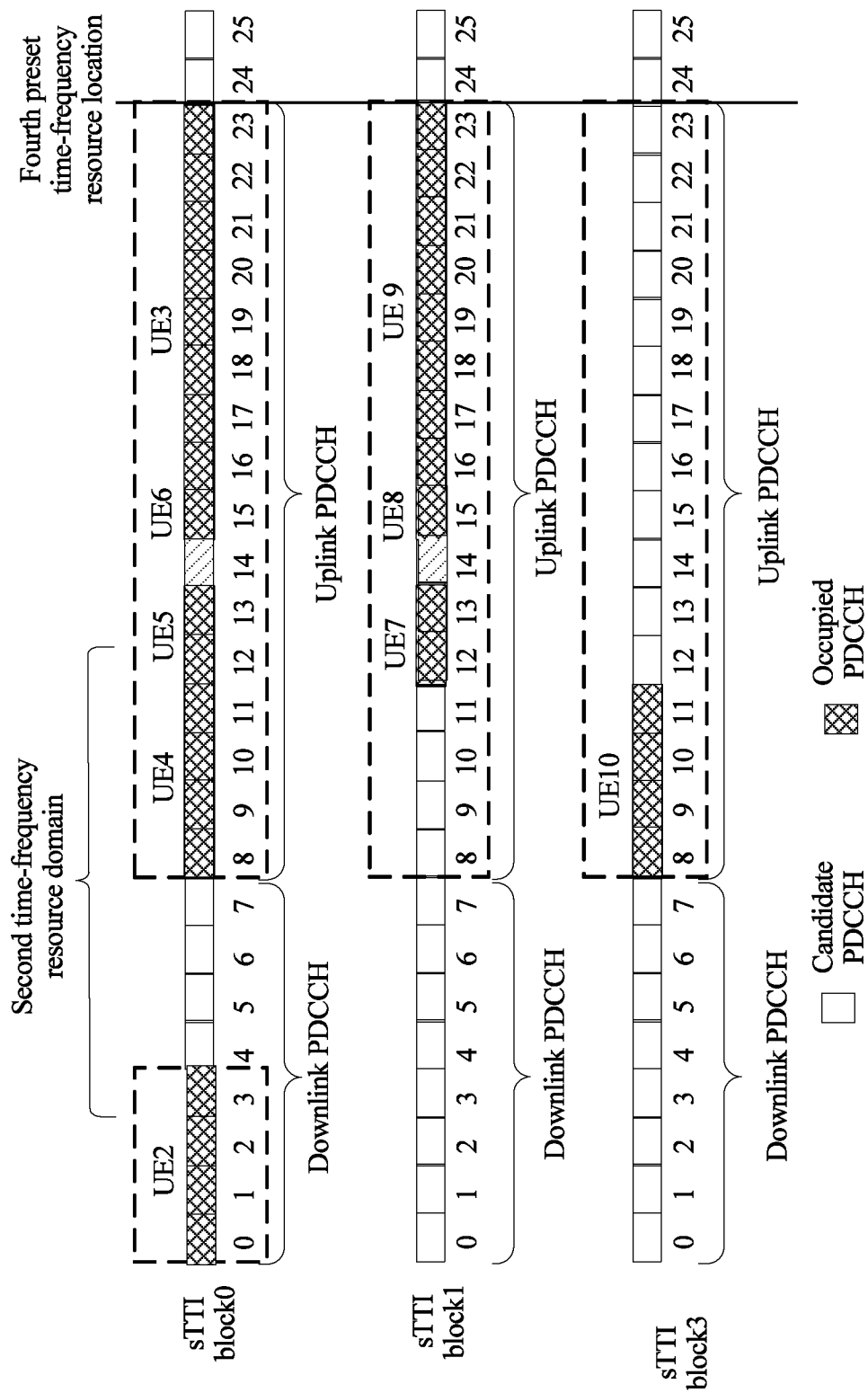
FIG. 8 is another schematic distribution diagram of a time-frequency resource occupied by the downlink control channel in FIG. 3.

FIG. 8 is another schematic distribution diagram of a time-frequency resource occupied by the downlink control channel in FIG. 3.

Referring to FIG. 3 and FIG. 8, optionally, that the base station sends, to the UE, a downlink data channel scheduled using the downlink control channel includes the following:

The base station sends, to the UE using time-frequency resources in at least two first time-frequency resource domains, the downlink data channel scheduled using the downlink control channel.

The downlink control channel carries third resource quantity indication information.

The second time-frequency resource domain includes a time-frequency resource determined based on a fourth preset time-frequency resource location in each first time-frequency resource domain and the third resource quantity indication information, and a time-frequency resource occupied by the downlink control channel used to schedule downlink data.

The following describes the foregoing embodiment in detail with reference to FIG. 8. Referring to FIG. 8, when sending the downlink data channel to the UE, the base station schedules two or more sTTI time-frequency resource blocks (block): an sTTI block0, an sTTI block1, and an sTTI block3, namely, two or more first time-frequency resource domains, to send the downlink data channel. In an implementation, the downlink control channel used to schedule downlink data is mapped in one of the two or more first time-frequency resource domains, and the uplink PDCCH used to schedule uplink data is mapped on some time-frequency resources in the two or more first time-frequency resource domains.

The base station maps, using control channel elements (a CCE0 to a CCE3) on the sTTI block0, the downlink control channel used to schedule downlink data for UE2, and performs, using control channel resources on the sTTI block0 and the sTTI block1 and starting from a known time-frequency resource location (the fourth preset time-frequency resource location) CCE23, resource mapping on the uplink PDCCH used to schedule uplink data.

Specifically, resource quantity information indicated by the third resource quantity indication information is a control channel element size indication, or resource quantity information indicated by the third resource quantity indication information is a control channel element location indication.

The third resource quantity indication information indicates only one piece of resource quantity information.

That the base station indicates a first time-frequency resource domain of the downlink data channel and a second time-frequency resource domain using the downlink control channel includes the following:

The base station indicates, using the one piece of resource quantity information, the time-frequency resource determined based on the fourth preset time-frequency resource location in each first time-frequency resource domain and the third resource quantity indication information.

Specifically, the resource quantity information is a length or a location of a control channel element that is occupied by the downlink control channel (the uplink PDCCH) used to schedule uplink data and that is in each first time-frequency resource domain. When the downlink control channel (the uplink PDCCH) used to schedule uplink data is mapped in each first time-frequency resource domain, the base station may indicate, using only the one piece of resource quantity information, a time-frequency resource that is used to map the downlink control channel used to schedule uplink data and that is in each first time-frequency resource domain. The one piece of resource quantity information is a length or a location of a control channel element, in the at least two first time-frequency resource domains, in which the downlink control channel (the uplink PDCCH) used to schedule uplink data occupies a largest quantity of time-frequency resources. For example, as shown in FIG. 8, the one piece of resource quantity information is used to indicate a length or a location of all CCEs from a CCE8 to a CCE23. Specifically, the resource quantity information may be indicated using 3-bit information.

After the foregoing embodiment is used, when a plurality of first time-frequency resource domains are scheduled for one UE to send the downlink data channel, only one piece of resource quantity information needs to be carried in the downlink control channel (the downlink PDCCH) used to schedule downlink data, to indicate a time-frequency resource that is occupied by the downlink control channel (the uplink PDCCH) used to schedule uplink data and that is in each first time-frequency resource domain, so as to determine time-frequency resources that are used to send the data channel and that are in the at least two first time-frequency resource domains. There is no need to indicate, using a plurality of pieces of resource quantity information, the time-frequency resource that is occupied by the downlink control channel (the uplink PDCCH) used to schedule uplink data and that is in each first time-frequency resource domain. Therefore, a bit quantity is reduced, and time-frequency resource use overheads are reduced.

Figure 9:
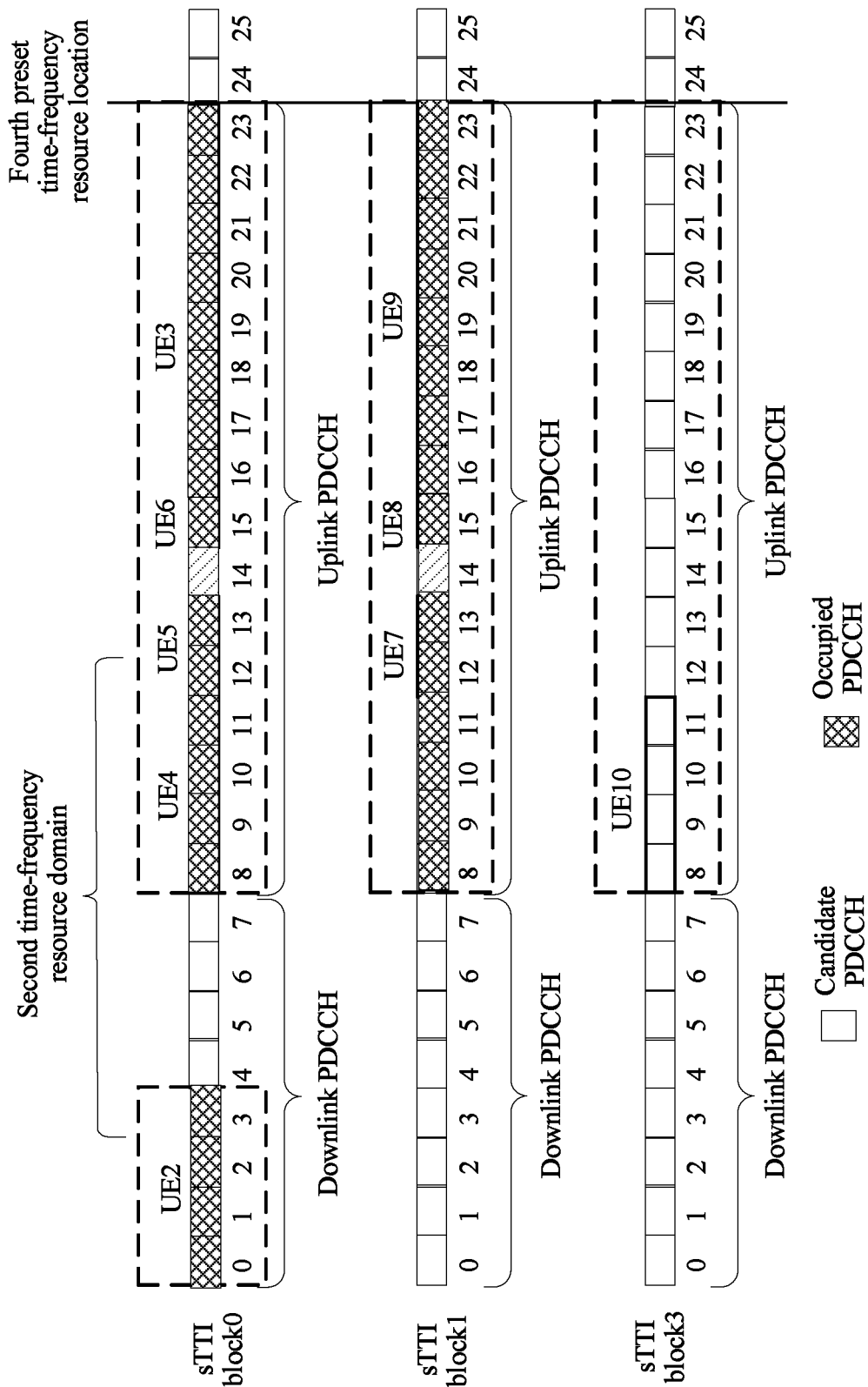
FIG. 9 is another schematic distribution diagram of a time-frequency resource occupied by the downlink control channel in FIG. 3.

FIG. 9 is another schematic distribution diagram of a time-frequency resource occupied by the downlink control channel in FIG. 3.

Referring to FIG. 3 and FIG. 9, on a basis of the foregoing embodiment, information about the time-frequency resource occupied by the downlink control channel further includes time-frequency resource scheduling indication information, the time-frequency resource scheduling indication information is used to indicate a specific first time-frequency resource domain, and all time-frequency resources in the specific first time-frequency resource domain are used to send a downlink channel to the UE.

Specifically, as shown in FIG. 9, in the first time-frequency resource domains sTTI block0, sTTI block1, and sTTI block3, the downlink control channel used to schedule downlink data and the downlink control channel used to schedule uplink data are not mapped on the sTTI block3. Therefore, the base station may send the downlink data channel on all time-frequency resources of the sTTI block3. The time-frequency resource scheduling indication information may be used to indicate a first time-frequency resource domain that is not occupied by the downlink control channel used to schedule uplink data and that is in the first time-frequency resource domains sTTI block0, sTTI block1, and sTTI block3, and all time-frequency resources in the first time-frequency resource domain are used to send the downlink data channel. Therefore, utilization of the plurality of first time-frequency resource domains is improved.

Specifically, the time-frequency resource scheduling indication information may be indicated using 2-bit information. For example, if a current frequency domain resource is divided into a total of four sTTI time-frequency resource blocks, Y=2, and "00, 01, 10, 11" respectively indicate that the downlink control channel used to schedule uplink data occupies one, two, three, and four sTTI blocks. It is assumed that three sTTIs blocks (the sTTI block0, the sTTI block1, and the sTTI block3) are allocated to a downlink user for which scheduling is performed, and the time-frequency resource scheduling indication information is "01". In this case, it indicates that two sTTI blocks are occupied by the downlink control channel used to schedule uplink data, and the two sTTI blocks are necessarily the first two of the three sTTI blocks, namely, the sTTI block0 and the sTTI block1.

Figure 10:
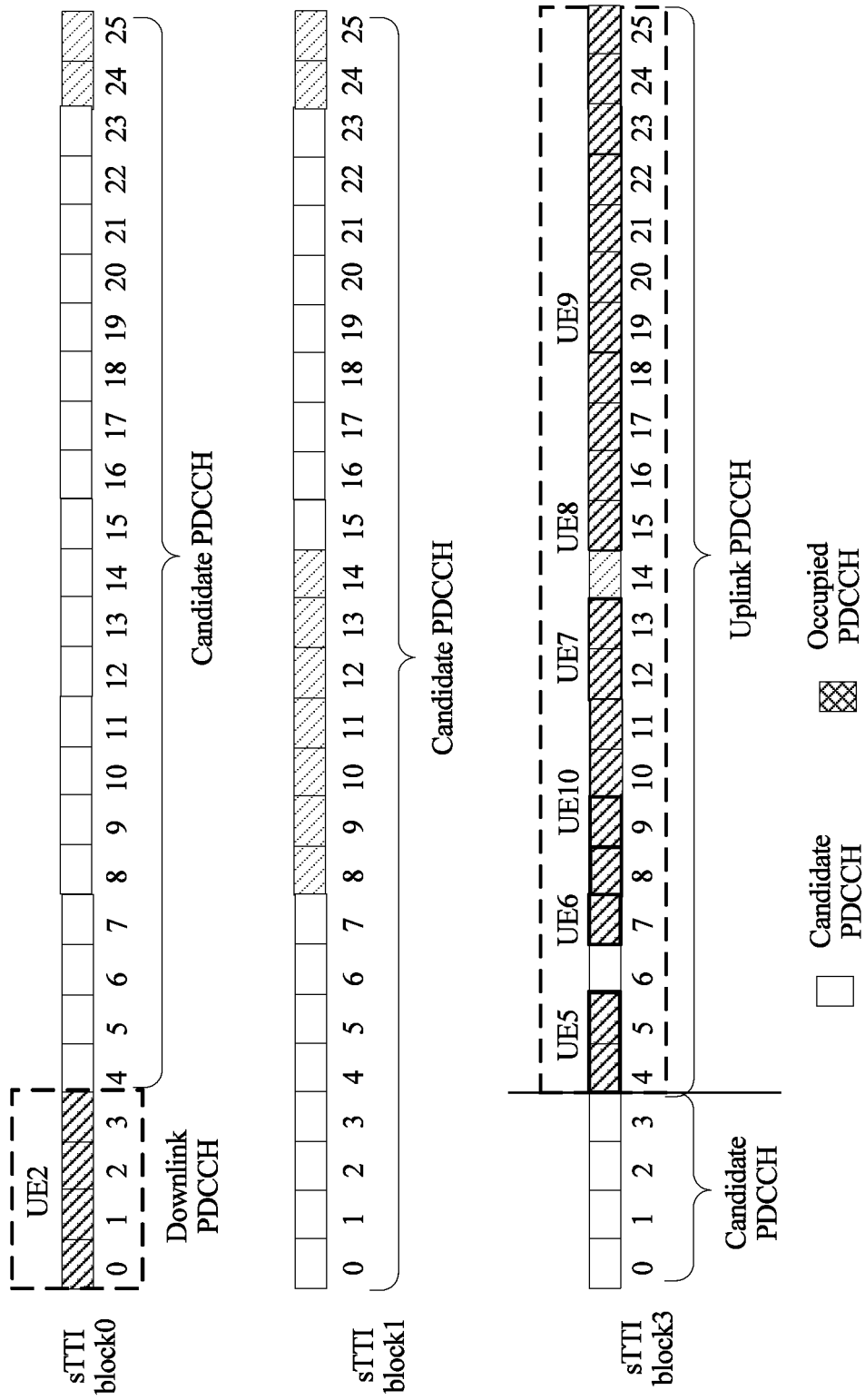
FIG. 10 is another schematic distribution diagram of a time-frequency resource occupied by the downlink control channel in FIG. 3.

FIG. 10 is another schematic distribution diagram of a time-frequency resource occupied by the downlink control channel in FIG. 3.

Referring to FIG. 3 and FIG. 10, that the base station sends, to the UE, a downlink data channel scheduled using the downlink control channel includes the following:

The base station sends, to the UE through time-frequency resources in at least two first time-frequency resource domains, the downlink data channel scheduled using the downlink control channel, where control channel elements in the at least two first time-frequency resource domains are connected in a head-to-tail manner to form a joint control channel resource domain.

The downlink control channel carries fourth resource quantity indication information, and the base station indicates the second time-frequency resource domain using the downlink control channel.

The second time-frequency resource domain includes a time-frequency resource determined based on a fifth preset time-frequency resource location in the joint control channel resource domain and the fourth resource quantity indication information, and a time-frequency resource occupied by the downlink control channel used to schedule downlink data.

Specifically, referring to FIG. 10, downlink scheduling is performed for the UE2 in the first time-frequency resource domains sTTI0, sTTI1, and sTTI3. Control channel elements in the first time-frequency resource domains sTTI0, sTTI1, and sTTI3 are connected in a head-to-tail manner for combination. All downlink control channels used to schedule uplink data are locally distributed in a control channel resource domain in the last first time-frequency resource domain sTTI3. The downlink control channel carries the fourth resource quantity indication information, to indicate length or location information of a time-frequency resource that is occupied by the downlink control channel used to schedule uplink data and that is in the last first time-frequency resource domain sTTI3. After detecting the downlink control channel used to schedule downlink data, the UE2 excludes, from the joint control channel resource domain, the time-frequency resource occupied by the downlink control channel used to schedule downlink data and the time-frequency resource determined based on the fifth preset time-frequency resource location and the fourth resource quantity indication information, to determine a time-frequency resource that can be used to send the downlink data channel. In the foregoing embodiments, a method for determining the fourth preset time-frequency resource location and the fifth preset time-frequency resource location is consistent with a method for determining the first preset time-frequency resource location to the third preset time-frequency resource location in the foregoing embodiment. Details are not described herein again.

In the data transmission method provided in the embodiment of the present disclosure, the base station sends, to the UE, the downlink control channel used to schedule downlink data and the downlink data channel scheduled using the downlink control channel, and indicates the first time-frequency resource domain of the downlink data channel and the second time-frequency resource domain using the downlink control channel. The downlink data channel is sent on the time-frequency resource that is in the first time-frequency resource domain and that does not belong to the second time-frequency resource domain. According to the data transmission method provided in the embodiment of the present disclosure, when sending, to the UE, the downlink control channel used to schedule downlink data, the base station may indicate an unoccupied time-frequency resource in a preset control channel time-frequency resource domain in a current sTTI using the downlink control channel. Therefore, when scheduling the downlink data channel, the base station can reuse the unoccupied time-frequency resource in the preset time-frequency resource domain used to send a PDCCH, to improve time-frequency resource utilization.

Figure 11:
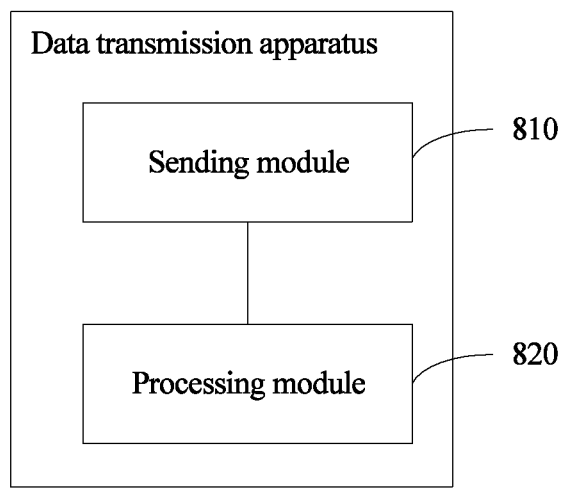
FIG. 11 is a schematic structural diagram of a data transmission apparatus according to an embodiment of the present disclosure.

FIG. 11 is a schematic structural diagram of a data transmission apparatus according to an embodiment of the present disclosure.

Referring to FIG. 11, this embodiment of the present disclosure further provides a data transmission apparatus. The data transmission apparatus includes a sending module 810, configured to send, to UE, a downlink control channel used to schedule downlink data, and to send, to the UE, a downlink data channel scheduled using the downlink control channel. The data transmission apparatus further includes a processing module 820 configured to indicate a first time-frequency resource domain of the downlink data channel and a second time-frequency resource domain using the downlink control channel. The downlink data channel is sent on a time-frequency resource that is in the first time-frequency resource domain and that does not belong to the second time-frequency resource domain.

Optionally, the processing module 820 is configured to indicate the second time-frequency resource domain using information about a time-frequency resource occupied by the downlink control channel.

Optionally, the processing module 820 is configured to indicate the second time-frequency resource domain using a first preset time-frequency resource location and the information about the time-frequency resource occupied by the downlink control channel.

Optionally, the information about the time-frequency resource occupied by the downlink control channel includes an end location of the time-frequency resource occupied by the downlink control channel, and the second time-frequency resource domain includes a time-frequency resource from the first preset time-frequency resource location to the end location of the time-frequency resource occupied by the downlink control channel.

Optionally, the information about the time-frequency resource occupied by the downlink control channel includes a start location of the time-frequency resource occupied by the downlink control channel, and the second time-frequency resource domain includes a time-frequency resource from the start location of the time-frequency resource occupied by the downlink control channel to a second preset time-frequency resource location.

Optionally, the downlink control channel carries first resource quantity indication information, and the processing module 820 is configured to indicate the second time-frequency resource domain based on the first resource quantity indication information in the downlink control channel and a location of a time-frequency resource occupied by the downlink control channel.

Optionally, the second time-frequency resource domain includes a time-frequency resource from a start location of the time-frequency resource occupied by the downlink control channel to a time-frequency resource location obtained after the start location of the time-frequency resource occupied by the downlink control channel is shifted by a resource quantity indicated by the first resource quantity indication information.

Optionally, the first resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of a time-frequency resource other than the time-frequency resource occupied by the downlink control channel in the second time-frequency resource domain; or a ratio of a size of a time-frequency resource other than the time-frequency resource occupied by the downlink control channel in the second time-frequency resource domain to the size of the preset time-frequency resource used to send a control channel.

Optionally, the downlink control channel carries second resource quantity indication information, and processing module 820 is configured to indicate the second time-frequency resource domain using the second resource quantity indication information in the downlink control channel and a third preset time-frequency resource location.

Optionally, the processing module 820 is configured to indicate, using the second resource quantity indication information in the downlink control channel and the third preset time-frequency resource location, a time-frequency resource other than a time-frequency resource occupied by the downlink control channel in the second time-frequency resource domain.

Optionally, the time-frequency resource other than the time-frequency resource occupied by the downlink control channel in the second time-frequency resource domain includes a time-frequency resource from the third preset time-frequency resource location to a time-frequency resource location obtained after the third preset time-frequency resource location is shifted by a resource quantity indicated by the second resource quantity indication information.

Optionally, the second resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of the time-frequency resource other than the time-frequency resource occupied by the downlink control channel in the second time-frequency resource domain; or a ratio of a size of the time-frequency resource other than the time-frequency resource occupied by the downlink control channel in the second time-frequency resource domain to the size of the preset time-frequency resource used to send a control channel.

Optionally, a ratio of a size of a time-frequency resource occupied by a downlink control channel set that is carried in the second time-frequency resource domain and that includes at least one downlink control channel to a size of the second time-frequency resource domain is greater than a preset threshold.

Figure 12:
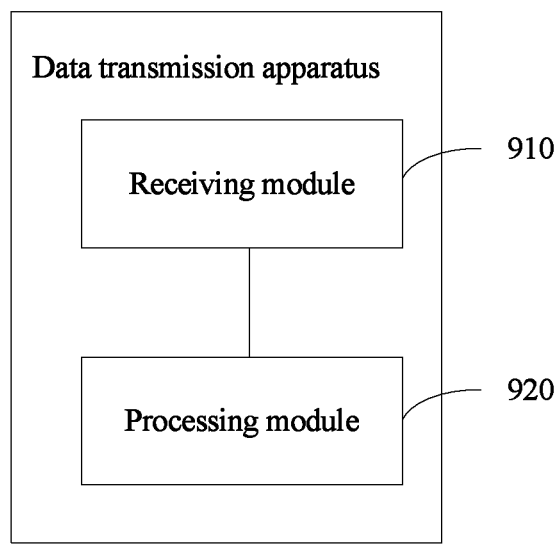
FIG. 12 is a schematic structural diagram of a data transmission apparatus according to another embodiment of the present disclosure.

FIG. 12 is a schematic structural diagram of a data transmission apparatus according to another embodiment of the present disclosure.

Referring to FIG. 12, the another embodiment of the present disclosure further provides a data transmission apparatus. The data transmission apparatus includes a receiving module 910 configured to receive a downlink control channel that is used to schedule downlink data and is sent by a base station, and a downlink data channel that is scheduled using the downlink control channel and is sent by the base station. The data transmission apparatus further includes a processing module 920 configured to determine a first time-frequency resource domain of the downlink data channel and a second time-frequency resource domain based on the received downlink control channel. The downlink data channel is not sent in the second time-frequency resource domain, and the downlink data channel is sent on a time-frequency resource that is in the first time-frequency resource domain and that does not belong to the second time-frequency resource domain.

Optionally, the processing module 920 is configured to determine the second time-frequency resource domain based on information about a time-frequency resource occupied by the downlink control channel.

Optionally, the processing module 920 is configured to determine the second time-frequency resource domain based on a first preset time-frequency resource location and the information about the time-frequency resource occupied by the downlink control channel.

Optionally, the information about the time-frequency resource occupied by the downlink control channel includes an end location of the time-frequency resource occupied by the downlink control channel, and the second time-frequency resource domain includes a time-frequency resource from the first preset time-frequency resource location to the end location of the time-frequency resource occupied by the downlink control channel.

Optionally, the information about the time-frequency resource occupied by the downlink control channel includes a start location of the time-frequency resource occupied by the downlink control channel, and the second time-frequency resource domain includes a time-frequency resource from the start location of the time-frequency resource occupied by the downlink control channel to a second preset time-frequency resource location.

Optionally, the downlink control channel carries first resource quantity indication information, and the processing module 920 is configured to determine the second time-frequency resource domain based on the first resource quantity indication information in the downlink control channel and a start location of a time-frequency resource occupied by the downlink control channel.

Optionally, the second time-frequency resource domain includes a time-frequency resource from the start location of the time-frequency resource occupied by the downlink control channel to a time-frequency resource location obtained after the start location of the time-frequency resource occupied by the downlink control channel is shifted by a resource quantity indicated by the first resource quantity indication information.

Optionally, the first resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of a time-frequency resource other than the time-frequency resource occupied by the downlink control channel in the second time-frequency resource domain; or a ratio of a size of a time-frequency resource other than the time-frequency resource occupied by the downlink control channel in the second time-frequency resource domain to the size of the preset time-frequency resource used to send a control channel.

Optionally, the downlink control channel carries second resource quantity indication information, and the processing module 920 is configured to determine the second time-frequency resource domain based on the second resource quantity indication information in the downlink control channel and a third preset time-frequency resource location.

Optionally, the processing module 920 is configured to determine, based on the second resource quantity indication information in the downlink control channel and the third preset time-frequency resource location, a time-frequency resource other than a time-frequency resource occupied by the downlink control channel in the second time-frequency resource domain.

Optionally, the time-frequency resource other than the time-frequency resource occupied by the downlink control channel in the second time-frequency resource domain includes a time-frequency resource from the third preset time-frequency resource location to a time-frequency resource location obtained after the third preset time-frequency resource location is shifted by a resource quantity indicated by the second resource quantity indication information.

Optionally, the second resource quantity indication information includes any one of the following: a size of the time-frequency resource included in the second time-frequency resource domain; a ratio of a size of the time-frequency resource included in the second time-frequency resource domain to a size of a preset time-frequency resource used to send a control channel; a size of the time-frequency resource other than the time-frequency resource occupied by the downlink control channel in the second time-frequency resource domain; or a ratio of a size of the time-frequency resource other than the time-frequency resource occupied by the downlink control channel in the second time-frequency resource domain to the size of the preset time-frequency resource used to send a control channel.

Optionally, a ratio of a size of a time-frequency resource occupied by a downlink control channel set that is carried in the second time-frequency resource domain and that includes at least one downlink control channel to a size of the second time-frequency resource domain is greater than a preset threshold.

Specifically, the data transmission apparatus provided in the embodiment of the present disclosure is configured to execute the data transmission method provided in the foregoing method embodiment. Specific implementations and achieved technical effects thereof are similar to those of the method embodiment, and details are not described herein again.

Figure 13:
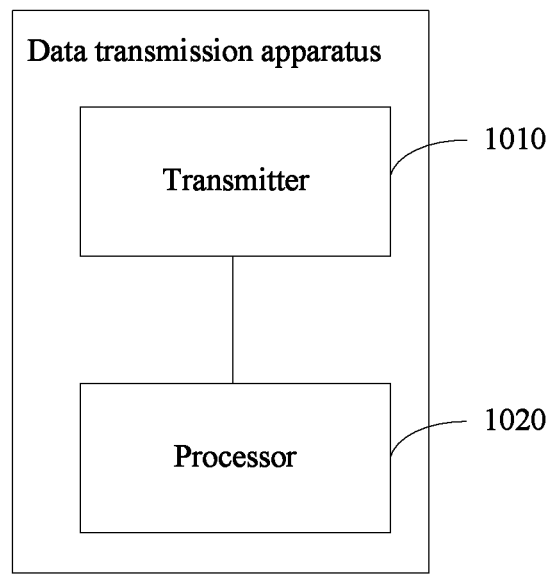
FIG. 13 is a schematic structural diagram of a data transmission apparatus according to another embodiment of the present disclosure.

FIG. 13 is a schematic structural diagram of a data transmission apparatus according to another embodiment of the present disclosure.

Referring to FIG. 13, this embodiment of the present disclosure further provides a data transmission apparatus. The data transmission apparatus includes a transmitter 1010 configured to send, to UE, a downlink control channel used to schedule downlink data, and to send, to the UE, a downlink data channel scheduled using the downlink control channel. The data transmission apparatus further includes a processor 1020 configured to indicate a first time-frequency resource domain of the downlink data channel and a second time-frequency resource domain using the downlink control channel. The downlink data channel is sent on a time-frequency resource that is in the first time-frequency resource domain and that does not belong to the second time-frequency resource domain.

Specifically, the data transmission apparatus provided in the embodiment of the present disclosure is configured to execute the data transmission method provided in the foregoing method embodiment. Specific implementations and achieved technical effects thereof are similar to those of the method embodiment, and details are not described herein again.

Figure 14:
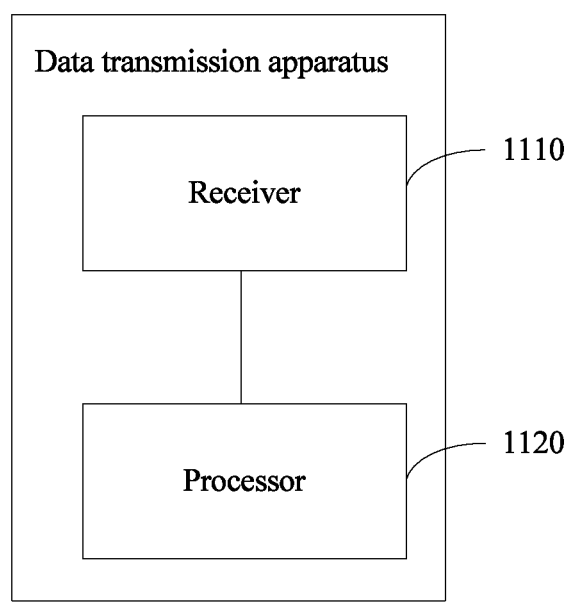
FIG. 14 is a schematic structural diagram of a data transmission apparatus according to another embodiment of the present disclosure.

FIG. 14 is a schematic structural diagram of a data transmission apparatus according to another embodiment of the present disclosure.

Referring to FIG. 14, this embodiment of the present disclosure further provides a data transmission apparatus. The data transmission apparatus includes a receiver 1110 configured to receive a downlink control channel that is used to schedule downlink data and is sent by a base station, and a downlink data channel that is scheduled using the downlink control channel and is sent by the base station. The data transmission apparatus includes a processor 1120 configured to determine a first time-frequency resource domain of the downlink data channel and a second time-frequency resource domain based on the received downlink control channel. The downlink data channel is not sent in the second time-frequency resource domain, and the downlink data channel is sent on a time-frequency resource that is in the first time-frequency resource domain and that does not belong to the second time-frequency resource domain.

Specifically, the data transmission apparatus provided in the embodiment of the present disclosure is configured to execute the data transmission method provided in the foregoing method embodiment. Specific implementations and achieved technical effects thereof are similar to those of the method embodiment, and details are not described herein again.

Persons of ordinary skill in the art may understand that all or some of the steps of the method embodiments may be implemented by a program instructing relevant hardware. The program may be stored in a storage medium that can be read by a computer, a mobile phone, or another portable apparatus. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are only intended for describing the technical solutions in the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of the present disclosure.

What is claimed is:

1. A method, comprising:
    sending, by a base station to UE, a downlink control channel for scheduling downlink data, and a downlink data channel scheduled using the downlink control channel; and
    indicating, by the base station, a first time-frequency resource domain of the downlink data channel and a second time-frequency resource domain using the downlink control channel, wherein the downlink data channel is sent on a first time-frequency resource that is in the first time-frequency resource domain and that does not belong to the second time-frequency resource domain;

wherein the downlink control channel carries first resource quantity indication information; and wherein indicating, by the base station, the second time-frequency resource domain using the downlink control channel comprises:

indicating the second time-frequency resource domain using the first resource quantity indication information in the downlink control channel and a location of a time-frequency resource occupied by the downlink control channel.

2. The method according to claim 1, wherein the second time-frequency resource domain comprises a second time-frequency resource from a start location of the time-frequency resource occupied by the downlink control channel to a time-frequency resource location positioned in accordance with the start location of the time-frequency resource occupied by the downlink control channel being shifted by a resource quantity indicated by the first resource quantity indication information.

3. An apparatus, comprising:
a transmitter;
a storage medium comprising instructions; and
one or more processors in communication with the storage medium, wherein the one or more processors execute the instructions to perform operations comprising:

sending, to UE using the transmitter, a downlink control channel for scheduling downlink data, and a downlink data channel scheduled using the downlink control channel; and indicating a first time-frequency resource domain of the downlink data channel and a second time-frequency resource domain using the downlink control channel, wherein the downlink data channel is sent on a first time-frequency resource that is in the first time-frequency resource domain and that does not belong to the second time-frequency resource domain;

wherein the downlink control channel carries first resource quantity indication information; and wherein the operations further comprise:
indicating the second time-frequency resource domain using the first resource quantity indication information in the downlink control channel and a location of a time-frequency resource occupied by the downlink control channel.

4. The apparatus according to claim 3, wherein the second time-frequency resource domain comprises a second time-frequency resource from a start location of the time-frequency resource occupied by the downlink control channel to a time-frequency resource location positioned in accordance with the start location of the time-frequency resource occupied by the downlink control channel being shifted by a resource quantity indicated by the first resource quantity indication information.

5. An apparatus, comprising:
a receiver;
a storage medium comprising instructions; and
one or more processors in communication with the storage medium, wherein the one or more processors execute the instructions to perform operations comprising:

receiving, using the receiver, a downlink control channel for scheduling downlink data, and a downlink data channel scheduled using the downlink control channel, the downlink control channel and the downlink data channel having been sent by a base station; and determining a first time-frequency resource domain of the downlink data channel and a second time-frequency resource domain according to the received downlink control channel, wherein the downlink data channel is sent on a first time-frequency resource that is in the first time-frequency resource domain and that does not belong to the second time-frequency resource domain;

wherein the downlink control channel carries first resource quantity indication information; and wherein the operations further comprise:
determining the second time-frequency resource domain according to the first resource quantity indication information in the downlink control channel and a start location of a time-frequency resource occupied by the downlink control channel.

6. The apparatus according to claim 5, wherein the second time-frequency resource domain comprises a second time-frequency resource from the start location of the time-frequency resource occupied by the downlink control channel to a time-frequency resource location positioned in accordance with the start location of the time-frequency resource occupied by the downlink control channel being shifted by a resource quantity indicated by the first resource quantity indication information.

7. The apparatus according to claim 6, wherein the first resource quantity indication information comprises any one of following:

a size of the second time-frequency resource of the second time-frequency resource domain; or a ratio of the size of the second time-frequency resource of the second time-frequency resource domain to a size of a preset time-frequency resource used to send a control channel; or a size of a time-frequency resource other than the time-frequency resource occupied by the downlink control channel in the second time-frequency resource domain; or a ratio of a size of a time-frequency resource other than the time-frequency resource occupied by the downlink control channel in the second time-frequency resource domain to a size of a preset time-frequency resource used to send a control channel.

* * * * *